United States Patent
Yan et al.

(10) Patent No.: US 12,452,172 B2
(45) Date of Patent: Oct. 21, 2025

(54) NETWORK CONGESTION CONTROL METHOD, APPARATUS, DEVICE, AND SYSTEM, AND STORAGE MEDIUM

(71) Applicant: HUAWEI TECHNOLOGIES CO., LTD., Guangdong (CN)

(72) Inventors: Jinfeng Yan, Nanjing (CN); Hewen Zheng, Nanjing (CN); Lei Han, Nanjing (CN); Heyang Liu, Nanjing (CN); Peiying Tao, Nanjing (CN); Yu Wang, Nanjing (CN); Xuejun Yao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 18/071,263

(22) Filed: Nov. 29, 2022

(65) Prior Publication Data

US 2023/0107366 A1    Apr. 6, 2023

Related U.S. Application Data

(63) Continuation of application No. PCT/CN2021/093165, filed on May 11, 2021.

(30) Foreign Application Priority Data

May 30, 2020  (CN) .......................... 202010480552.2

(51) Int. Cl.
*H04L 47/12* (2022.01)
*H04L 47/10* (2022.01)
(Continued)

(52) U.S. Cl.
CPC ............. *H04L 47/12* (2013.01); *H04L 47/10* (2013.01); *H04L 47/115* (2013.01); *H04L 47/26* (2013.01)

(58) Field of Classification Search
None
See application file for complete search history.

(56) References Cited

U.S. PATENT DOCUMENTS 7,305,464 B2 * 12/2007 Phillipi ................... H04L 67/52
709/226
11,888,744 B2 * 1/2024 Meng ...................... H04L 45/48
(Continued)

FOREIGN PATENT DOCUMENTS

| CN | 106330742 A | 1/2017 |
|---|---|---|
| CN | 109802894 A | 5/2019 |
| CN | 109981471 A | 7/2019 |
| KR | 101992750 B1 | 6/2019 |
| WO | 2021008562 A1 | 1/2021 |

OTHER PUBLICATIONS

Zhu et al., "Congestion Control for Large-Scale RDMA Deployments," ACM SIGCOMM Computer Communication Review, Aug. 17, 2015, 45(4):523-536.

(Continued)

*Primary Examiner* — Quang N Nguyen
(74) *Attorney, Agent, or Firm* — Fish & Richardson P.C.

(57) ABSTRACT

This application discloses a network congestion control method, apparatus, device, and system, and a storage medium. In an example method, a first switch receives a target signaling packet that is sent by a second switch in a case in which a network congestion status is a target network congestion status. The target signaling packet carries flow source information. The first switch sends, based on the target signaling packet, target flow control information to a network device corresponding to the flow source information. The target flow control information is used to indicate flow control.

19 Claims, 9 Drawing Sheets

Transmit-end NIC
Reaction point
(RP)

Switch
Congestion point
(CP)

Receive-end NIC
Notification point
(NP)

(51) Int. Cl.
*H04L 47/11* (2022.01)
*H04L 47/26* (2022.01)

(56) References Cited

U.S. PATENT DOCUMENTS

| | | | |
|---|---|---|---|
| 2008/0089347 A1* | 4/2008 | Phillipi | H04L 43/50 |
| | | | 370/400 |
| 2018/0198715 A1* | 7/2018 | Shmilovici | H04L 47/2483 |
| 2018/0232252 A1 | 8/2018 | Rong et al. | |
| 2020/0021532 A1 | 1/2020 | Borikar et al. | |
| 2020/0177513 A1* | 6/2020 | Zhang | H04L 67/5651 |
| 2021/0006502 A1* | 1/2021 | Zhou | H04L 47/6275 |
| 2021/0320866 A1* | 10/2021 | Le | H04L 47/621 |
| 2021/0344600 A1* | 11/2021 | Urman | H04L 47/326 |

OTHER PUBLICATIONS

Hu et al., "Tagger: Practical PFC Deadlock Prevention in Data Center Networks," IEEE /ACM Transactions On Networking, vol. 27, No. 2, Apr. 2019, pp. 889-902.
Extended European Search Report in European Appln No. 21817960.4, dated Qct. 2, 2023, 9 pages.
P802.1 Qcz/D1.0, "Draft Standard for Local and metropolitan area networks—Bridges and Bridged Networks—Amendment: Congestion Isolation," LAN/MAN Standards Committee of the IEEE Computer Society, Apr. 15, 2020, 218 pages.
International Search Report and Written Opinion in International Appln. No. PCT/CN2021/093165, mailed on Aug. 11, 2021, 15 pages (with English translation).

* cited by examiner

Transmit-end NIC
Reaction point
(RP)

Switch
Congestion point
(CP)

Receive-end NIC
Notification point
(NP)

NETWORK CONGESTION CONTROL METHOD, APPARATUS, DEVICE, AND SYSTEM, AND STORAGE MEDIUM

CROSS-REFERENCE TO RELATED APPLICATIONS

This application is a continuation of International Application No. PCT/CN2021/093165, filed on May 11, 2021, which claims priority to Chinese Patent Application No. 202010480552.2, filed on May 30, 2020, The disclosures of the aforementioned applications are hereby incorporated by reference in their entireties.

TECHNICAL FIELD

This application relates to the field of communications technologies, and in particular, to a network congestion control method, apparatus, device, and system, and a storage medium.

BACKGROUND

With emergence and wide use of applications such as high-performance computing and distributed storage, requirements for a high throughput, a low delay, and low central processing unit (central processing unit, CPU) overheads are put forward for a data center network and a protocol. Because CPU overheads in the conventional transmission control protocol/Internet protocol (transmission control protocol/internet protocol, TCP/IP) are extremely high, requirements for these applications cannot be well met. Therefore, user-mode applications are allowed to directly read and write a remote memory, and a remote direct memory access (remote direct memory access, RDMA) protocol without kernel intervention and memory copying accordingly emerges.

Currently, the widely used RDMA protocol is the RDMA over converged Ethernet (RDMA over converged ethernet, RoCE) protocol. In a RoCE network, effectively controlling network congestion is the key to reducing a service delay and supporting large-scale RoCE networking.

SUMMARY

Embodiments of this application provide a network congestion control method, apparatus, device, and system, and a storage medium, to resolve a problem brought by the related technologies. Technical solutions are as follows.

According to a first aspect, a network congestion control method is provided. For example, the method is applied to a first switch. The method includes: The first switch receives a target signaling packet that is sent by a second switch in a target network congestion status. The target signaling packet carries flow source information. The first switch sends, based on the target signaling packet, target flow control information to a network device corresponding to the flow source information. The target flow control information is used to indicate flow control.

In the method provided in this embodiment of this application, after the target signaling packet that is sent by the second switch in the target network congestion status is received, the target flow control information is sent to the network device corresponding to the flow source information carried in the target signaling packet, to indicate flow control, suppress a queue backlog on a congestion side, and ensure a low service delay, without affecting a service throughput. In this way, large-scale RoCE networking can be supported, thereby resolving a DCQCN speed control failure problem in a large-scale high-concurrency scenario.

In a possible implementation of the first aspect, sending, based on the target signaling packet, the target flow control information to the network device corresponding to the flow source information includes: sending, based on the target signaling packet, first flow control information to the network device corresponding to the flow source information. The first flow control information is used to indicate the network device to suspend sending a data packet of a target queue. The target queue is one or more queues of the network device.

The first flow control information is used to indicate the network device corresponding to the flow source information to suspend sending the data packet of the target queue, to effectively suppress the queue backlog on the congestion side and further ensure a low service delay.

In a possible implementation of the first aspect, the sending, based on the target signaling packet, first flow control information to the network device corresponding to the flow source information includes: constructing a first priority-based flow control PFC packet based on the target signaling packet, where a value of a time field of the first PFC packet is a first value, and the first value is used to indicate the first flow control information; and sending the first PFC packet to the network device corresponding to the flow source information.

In a possible implementation of the first aspect, receiving the target signaling packet that is sent by the second switch in the target network congestion status includes: receiving a first signaling packet that is sent by the second switch in the target network congestion status. The first signaling packet is used to indicate to send the first flow control information.

In a possible implementation of the first aspect, the receiving a first signaling packet that is sent by the second switch in the target network congestion status includes: receiving a first congestion notification packet (CNP) that is sent by the second switch in the target network congestion status. A value of a specific field in a frame header of the first CNP is a first feature value. The first feature value is used to indicate to send the first flow control information.

In a possible implementation of the first aspect, sending, based on the target signaling packet, the target flow control information to the network device corresponding to the flow source information includes: sending, based on the target signaling packet, second flow control information to the network device corresponding to the flow source information. The second flow control information is used to indicate the network device to continue sending a data packet of a target queue. The target queue is one or more queues of the network device.

The second flow control information is used to indicate the network device corresponding to the flow source information to continue sending the data packet of the target queue, without affecting a service throughput.

In a possible implementation of the first aspect, the sending, based on the target signaling packet, second flow control information to the network device corresponding to the flow source information includes: constructing a second priority-based flow control PFC packet based on the target signaling packet, where a value of a time field of the second PFC packet is a second value, and the second value is used to indicate the second flow control information; and sending the second PFC packet to the network device corresponding to the flow source information.

In a possible implementation of the first aspect, receiving the target signaling packet that is sent by the second switch in the target network congestion status includes: receiving a second signaling packet that is sent by the second switch in the target network congestion status. The second signaling packet is used to indicate to send the second flow control information.

In a possible implementation of the first aspect, the receiving a second signaling packet that is sent by the second switch in the target network congestion status includes: receiving a second congestion notification packet CNP that is sent by the second switch in the target network congestion status. A value of a specific field in a frame header of the second CNP is a second feature value. The second feature value is used to indicate to send the second flow control information.

In a possible implementation of the first aspect, sending, based on the target signaling packet, the target flow control information to the network device corresponding to the flow source information includes: determining a flow source port based on the flow source information carried in the target signaling packet; and sending, by using the flow source port, the target flow control information to the network device corresponding to the flow source information.

In a possible implementation of the first aspect, the sending, by using the flow source port, the target flow control information to the network device corresponding to the flow source information includes: sending, by using the flow source port, third flow control information to the network device corresponding to the flow source information. The third flow control information is used to indicate to suspend sending a data packet of a queue corresponding to the flow source port.

In a possible implementation of the first aspect, the sending, by using the flow source port, the target flow control information to the network device corresponding to the flow source information includes: sending, by using the flow source port, fourth flow control information to the network device corresponding to the flow source information. The fourth flow control information is used to indicate to continue sending a data packet of a queue corresponding to the flow source port.

According to a second aspect, a method applied to a second switch is provided. The method includes: The second switch recognizes a network congestion status, and sends a target signaling packet to a first switch in response to a case in which the network congestion status is a target network congestion status. The target signaling packet carries flow source information. The target signaling packet is used to indicate the first switch to perform flow control.

In the method provided in this embodiment of this application, the network congestion status is recognized. In the target network congestion status, the first switch is indicated by using the target signaling packet to perform flow control, to suppress a queue backlog on a congestion side and ensure a low service delay, without affecting a service throughput. In this way, large-scale RoCE networking can be supported, thereby resolving a DCQCN speed control failure problem in a large-scale high-concurrency scenario.

In a possible implementation of the second aspect, the target signaling packet includes a first signaling packet or a second signaling packet. Sending the target signaling packet to the first switch in response to the case in which the network congestion status is the target network congestion status includes: sending the first signaling packet to the first switch in response to a case in which the network congestion status is the target network congestion status and a current queue length is greater than a first threshold, where the first signaling packet is used to indicate the first switch to send first flow control information, the first flow control information is used to indicate a network device corresponding to the flow source information to suspend sending a data packet of a target queue, and the target queue is one or more queues of the network device; or sending the second signaling packet to the first switch in response to a case in which the network congestion status is the target network congestion status and a current queue length is less than a second threshold, where the second signaling packet is used to indicate the first switch to send second flow control information, the second flow control information is used to indicate the network device to continue sending a data packet of a target queue, and the second threshold is less than a first threshold.

In a possible implementation of the second aspect, before the sending the first signaling packet to the first switch, the method further includes: obtaining a first CNP, setting a value of a specified field in a frame header of the first CNP to a first feature value, and using the first CNP as the first signaling packet.

Before the sending the second signaling packet to the first switch, the method further includes: obtaining a second CNP, setting a value of a specified field in a frame header of the second CNP to a second feature value, and using the second CNP as the second signaling packet.

Constructing the first signaling packet r the second signaling packet by using the CNP is merely an example. The first signaling packet or the second signaling packet may alternatively be constructed by using another type of packet format. This is not limited in this embodiment of this application.

In a possible implementation of the second aspect, recognizing the network congestion status includes: reading a current queue length and an explicit congestion notification ECN threshold range, where the ECN threshold range is used to indicate a probability of adding an ECN identifier, and the ECN identifier is used to indicate that congestion occurs in a network; and recognizing the network congestion status based on the current queue length and the ECN threshold range.

Different network congestion statuses are recognized, to facilitate subsequent corresponding control for network congestion based on different network congestion statuses.

According to a third aspect, a network congestion control method is provided. The method is applied to a network device. The method includes: A network device receives target flow control information sent by a first switch, and performs flow control based on the target flow control information. The target flow control information is used to indicate flow control. The target flow control information is sent after the first switch receives a target signaling packet that is sent by a second switch in a target network congestion status.

In the method provided in this embodiment of this application, after the target flow control information sent by the first switch is received, flow control is performed based on the target flow control information, to suppress a queue backlog on a congestion side and ensure a low service delay, without affecting a service throughput. In this way, large-scale RoCE networking can be supported, thereby resolving a DCQCN speed control failure problem in a large-scale high-concurrency scenario.

In a possible implementation of the third aspect, receiving the target flow control information sent by the first switch includes: receiving first flow control information sent by the first switch. The first flow control information is used to indicate to suspend sending a data packet of a target queue. The target queue is one or more queues of the network device.

Performing flow control based on the target flow control information includes: suspending, based on the first flow control information, sending the data packet of the target queue.

In a possible implementation of the third aspect, receiving the first flow control information sent by the first switch includes: receiving a first PFC packet sent by the first switch. A value of a time field of the first PFC packet is a first value. The first value is used to indicate the first flow control information.

Suspending sending, based on the first flow control information, the data packet of the target queue includes: determining, based on the value of the time field of the first PFC packet, duration of suspending sending the data packet, and suspending sending the data packet of the target queue within the duration.

In a possible implementation of the third aspect, receiving the target flow control information sent by the first switch includes: receiving second flow control information sent by the first switch. The second flow control information is used to indicate to continue sending a data packet of a target queue. The target queue is one or more queues of the network device.

Performing flow control based on the target flow control information includes: continuing, based on the second flow control information, sending the data packet of the target queue.

In a possible implementation of the third aspect, receiving the second flow control information sent by the first switch includes: receiving a second PFC packet sent by the first switch. A value of a time field of the second PFC packet is a second value. The second value is used to indicate the second flow control information.

Continuing, based on the second flow control information, sending the data packet of the target queue includes: continuing, based on the value of the time field of the second PFC packet, sending the data packet of the target queue.

According to a fourth aspect, a network congestion control apparatus is provided. The apparatus includes:
  a receiving module, configured to receive a target signaling packet that is sent by a second switch in a target network congestion status, where the target signaling packet carries flow source information; and
  a sending module, configured to send, based on the target signaling packet, target flow control information to a network device corresponding to the flow source information, where the target flow control information is used to indicate flow control.

In a possible implementation of the fourth aspect, the sending module is configured to send, based on the target signaling packet, first flow control information to the network device corresponding to the flow source information. The first flow control information is used to indicate the network device to suspend sending a data packet of a target queue. The target queue is one or more queues of the network device.

In a possible implementation of the fourth aspect, the sending module is configured to: construct a first priority-based flow control PFC packet based on the target signaling packet, where a value of a time field of the first PFC packet is a first value, and the first value is used to indicate the first flow control information; and send the first PFC packet to the network device corresponding to the flow source information.

In a possible implementation of the fourth aspect, the receiving module is configured to receive a first signaling packet that is sent by the second switch in the target network congestion status. The first signaling packet is used to indicate to send the first flow control information.

In a possible implementation of the fourth aspect, the receiving module is configured to receive a first congestion notification packet CNP that is sent by the second switch in the target network congestion status. A value of a specific field in a frame header of the first CNP is a first feature value. The first feature value is used to indicate to send the first flow control information.

In a possible implementation of the fourth aspect, the sending module is configured to: send, based on the target signaling packet, second flow control information to the network device corresponding to the flow source information. The second flow control information is used to indicate the network device to continue sending a data packet of a target queue. The target queue is one or more queues of the network device.

In a possible implementation of the fourth aspect, the sending module is configured to: construct a second priority-based flow control PFC packet based on the target signaling packet, where a value of a time field of the second PFC packet is a second value, and the second value is used to indicate the second flow control information; and send the second PFC packet to the network device corresponding to the flow source information.

In a possible implementation of the fourth aspect, the receiving module is configured to receive a second signaling packet that is sent by the second switch in the target network congestion status. The second signaling packet is used to indicate to send the second flow control information.

In a possible implementation of the fourth aspect, the receiving module is configured to receive a second congestion notification packet CNP that is sent by the second switch in the target network congestion status. A value of a specific field in a frame header of the second CNP is a second feature value. The second feature value is used to indicate to send the second flow control information.

In a possible implementation of the fourth aspect, the sending module is configured to: determine a flow source port based on the flow source information carried in the target signaling packet; and send, by using the flow source port, the target flow control information to the network device corresponding to the flow source information.

In a possible implementation of the fourth aspect, the sending module is configured to send, by using the flow source port, third flow control information to the network device corresponding to the flow source information. The third flow control information is used to indicate to suspend sending a data packet of a queue corresponding to the flow source port.

In a possible implementation of the fourth aspect, the sending module is configured to send, by using the flow source port, fourth flow control information to the network device corresponding to the flow source information. The fourth flow control information is used to indicate to continue sending a data packet of a queue corresponding to the flow source port.

According to a fifth aspect, a network congestion control apparatus is provided. The apparatus includes:
  a recognizing module, configured to recognize a network congestion status; and a sending module, configured to send a target signaling packet to a first switch in response to a case in which the network congestion status is a target network congestion status, where the target signaling packet carries flow source information, and the target signaling packet is used to indicate the first switch to perform flow control.

In a possible implementation of the fifth aspect, the target signaling packet includes a first signaling packet or a second signaling packet. The sending module is configured to: send the first signaling packet to the first switch in response to a case in which the network congestion status is the target network congestion status and a current queue length is greater than a first threshold, where the first signaling packet is used to indicate the first switch to send first flow control information, the first flow control information is used to indicate a network device corresponding to the flow source information to suspend sending a data packet of a target queue, and the target queue is one or more queues of the network device; or send the second signaling packet to the first switch in response to a case in which the network congestion status is the target network congestion status and a current queue length is less than a second threshold, where the second signaling packet is used to indicate the first switch to send second flow control information, the second flow control information is used to indicate the network device to continue sending a data packet of a target queue, and the second threshold is less than a first threshold.

In a possible implementation of the fifth aspect, the apparatus further includes:

an obtaining module, configured to: obtain a first CNP, set a value of a specified field in a frame header of the first CNP to a first feature value, and use the first CNP as the first signaling packet; or an obtaining module, configured to: obtain a second CNP, set a value of a specified field in a frame header of the second CNP to a second feature value, and use the second CNP as the second signaling packet.

In a possible implementation of the fifth aspect, the recognizing module is configured to: read a current queue length and an explicit congestion notification ECN threshold range, where the ECN threshold range is used to indicate a probability of adding an ECN identifier, and the ECN identifier is used to indicate that congestion occurs in a network; and recognize the network congestion status based on the current queue length and the ECN threshold range.

In a possible implementation of the fifth aspect, the target network congestion status includes an ECN failure state or a congestion notification packet CNP failure state. The recognizing module is configured to: recognize the network congestion status as the ECN failure state in response to a case in which the current queue length is greater than a maximum value in a reference range and a CNP is not supplemented, where the reference range is determined based on the ECN threshold range; or recognize the network congestion status as the CNP failure state in response to a case in which the current queue length is greater than a maximum value in a reference range and a CNP is supplemented.

According to a sixth aspect, a network congestion control apparatus is provided. The apparatus includes:

a receiving module, configured to: receive target flow control information sent by a first switch, where the target flow control information is used to indicate flow control, and the target flow control information is sent after the first switch receives a target signaling packet that is sent by a second switch in a target network congestion status; and a control module, configured to perform flow control based on the target flow control information.

In a possible implementation of the sixth aspect, the receiving module is configured to receive first flow control information sent by the first switch. The first flow control information is used to indicate to suspend sending a data packet of a target queue. The target queue is one or more queues of the network device.

The control module is configured to suspend, based on the first flow control information, sending the data packet of the target queue.

In a possible implementation of the sixth aspect, the receiving module is configured to receive a first PFC packet sent by the first switch. A value of a time field of the first PFC packet is a first value. The first value is used to indicate the first flow control information.

The control module is configured to: determine, based on the value of the time field of the first PFC packet, duration of suspending sending the data packet, and suspend sending the data packet of the target queue within the duration In a possible implementation of the sixth aspect, the receiving module is configured to receive second flow control information sent by the first switch. The second flow control information is used to indicate to continue sending a data packet of a target queue. The target queue is one or more queues of the network device.

The control module is configured to continue, based on the second flow control information, sending the data packet of the target queue, In a possible implementation of the sixth aspect, the receiving module is configured to receive a second PFC packet sent by the first switch. A value of a time field of the second PFC packet is a second value. The second value is used to indicate the second flow control information.

The control module is configured to continue, based on the value of the time field of the second PFC packet, sending the data packet of the target queue.

In a possible implementation of the first aspect to the sixth aspect, the target network congestion status includes an explicit congestion notification (explicit congestion notification, ECN) failure state or a congestion notification packet (congestion notification packet, CNP) failure state.

The ECN failure state is a state in which the current queue length of the second switch is greater than a maximum value in a reference range and the CNP is not supplemented. The CNP failure state is a state in which the current queue length of the second switch is greater than the maximum value in the reference range and the CNP is supplemented. The reference range is determined based on an ECN threshold range. The ECN threshold range is used to indicate a probability of adding an ECN identifier. The ECN identifier is used to indicate that congestion occurs in a network.

A network congestion control device is further provided. The device includes a memory and a processor. The memory stores at least one instruction. The at least one instruction is loaded and executed by the processor, to implement the network congestion control method in the first aspect.

A network congestion control device is further provided. The device includes a memory and a processor. The memory stores at least one instruction. The at least one instruction is loaded and executed by the processor, to implement the network congestion control method in the second aspect.

A network congestion control device is further provided. The device includes a memory and a processor. The memory stores at least one instruction. The at least one instruction is loaded and executed by the processor, to implement the network congestion control method in the third aspect.

A network congestion control system is further provided. The system includes the foregoing three devices.

A computer readable storage medium is further provided. The storage medium stores at least one instruction. The instruction is loaded and executed by a processor to implement the network congestion control method in any one of the first aspect to the third aspect.

Another communications apparatus is provided. The apparatus includes a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to transmit a signal. When the processor executes the instructions stored in the memory, the processor is enabled to perform the method in the first aspect or any possible implementation of the first aspect. Alternatively, when the processor executes the instructions stored in the memory, the processor is enabled to perform the method in the second aspect or any possible implementation of the second aspect. Alternatively, when the processor executes the instructions stored in the memory, the processor is enabled to perform the method in the third aspect or any possible implementation of the third aspect.

In an example embodiment, there are one or more processors, and there are one or more memories.

In an example embodiment, the memory may be integrated with the processor, or the memory and the processor are separately disposed.

In a specific implementation process, the memory may be a non-transitory (non-transitory) memory, for example, a read-only memory (read only memory, ROM). The memory and the processor may be integrated into a same chip, or may be disposed on different chips. A type of the memory and a manner in which the memory and the processor are disposed are not limited in this embodiment of this application.

A computer program (product) is provided. The computer program (product) includes computer program code. When the computer program code is run on a computer, the computer is enabled to perform the methods in the foregoing aspects.

A chip is provided and includes a processor configured to: invoke instructions from a memory, and run the instructions stored in the memory, so that a communications device on which the chip is installed performs the methods in the aspects.

Another chip is provided and includes an input interface, an output interface, a processor, and a memory. The input interface, the output interface, the processor, and the memory are interconnected through an internal connection path. The processor is configured to execute code in the memory. When the code is executed, the processor is configured to perform the methods in the foregoing aspects.

DESCRIPTION OF EMBODIMENTS

Terms used in embodiments of this application are merely used to explain specific embodiments of this application, but are not intended to limit this application.

Because CPU overheads in the conventional TCP/IP protocol are extremely large and cannot well meet the requirements for a high throughput, a low delay, and low CPU overheads put forward by the data center network and the protocol, the RDMA protocol emerges.

Currently, the widely used RDMA protocol is the RoCE protocol. The RoCE protocol has two versions: RoCE 1 and RoCE 2. The RoCE 1 is an RDMA protocol implemented based on an Ethernet link layer, and RoCE 2 is an RDMA protocol implemented based on a user datagram protocol (user datagram protocol, UDP) layer in the Ethernet TCP/IP protocol. Currently, in the RoCE network in any version of the RoCE protocol, effectively controlling network congestion is the key to reducing a service delay and supporting large-scale RoCE networking.

Figure 1:
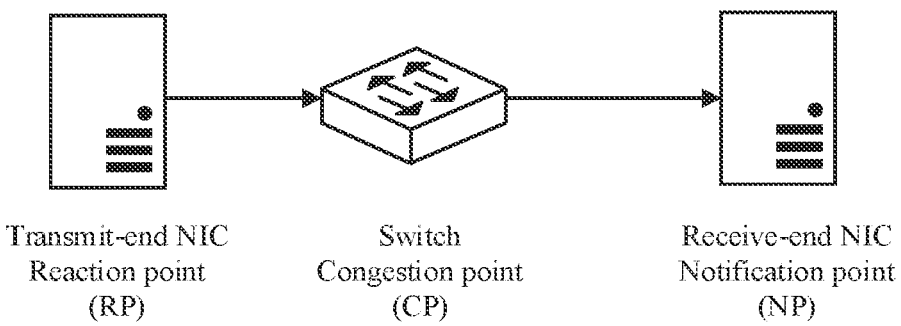
FIG. 1 is a schematic diagram of network architecture provided in the related technologies.

For this purpose, a related technology provides a data center quantized congestion notification (data center quantized congestion notification, DCQCN) algorithm to perform congestion control on the RoCE network. A network architecture shown in FIG. 1 is used as an example. The network architecture includes a transmit-end network interface controller (network interface controller, NIC), a switch, and a receive-end NIC. The transmit-end NIC is a reaction point (Reaction Point, RP), the switch is a congestion point (congestion point, CP), and the receive-end MC is a notification point (Notification Point, NP).

On a switch side, when a data packet arrives at an egress port of the switch, the switch checks a queue butler length of the egress port of the switch. If the queue buffer length of an egress end of the switch exceeds a specified threshold, the data packet is marked with an explicit congestion notification (explicit congestion notification, ECN) identifier according to a marking probability. The ECN is originally defined in the RFC 3168. The switch is implemented through embedding a congestion indicator in an IP header and embedding a congestion acknowledgment in a TCP header when congestion is detected. The RoCEv2 standard defines RoCEv2 congestion management (RCM). After the ECN is enabled, once the switch detects that flow congestion occurs in the RoCEv2, an ECN field in the IP header of the data packet is marked.

The congestion indicator is interpreted by a destination terminal node according to a forward explicit congestion notification (forward explicit congestion notification, FECN) congestion indication identifier in a base transport header (base transport header, BTH) in an IB data segment. In other words, when the data packet marked with the ECN arrives at an originally intended destination, a congestion notification is fed back to a source node, and the source node responds to the congestion notification through limiting a rate of a network data packet for a queue pair (queue pairs, QP) with congestion.

Figure 2:
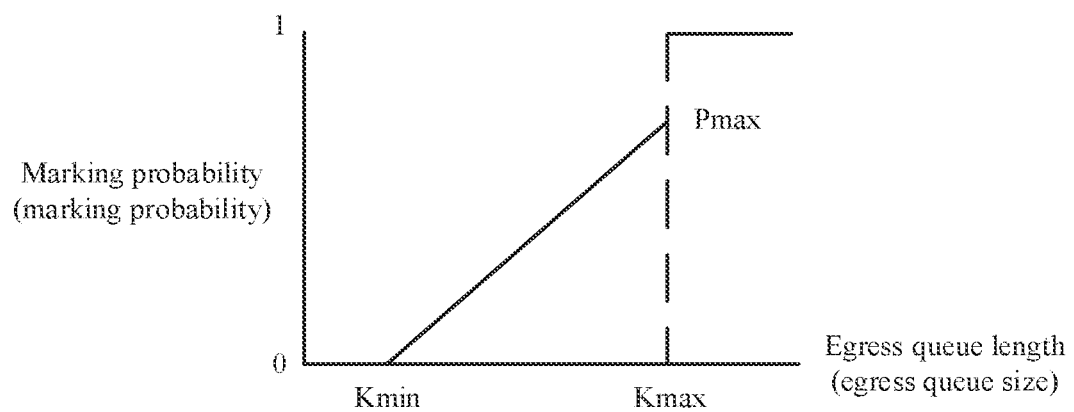
FIG. 2 is a schematic diagram of an ECN identification model according to an embodiment of this application.

For example, ECN is marked according to a marking probability by using an ECN identification model shown in FIG. 2. When the queue buffer length of the egress end of the switch is less than a specified lower limit threshold kmin, the marking probability is 0%. When the queue buffer length of the egress end of the switch is greater than a specified upper limit threshold kmax, the marking probability is 100%. When the queue buffer length of the egress end of the switch is between kmin and kmax, the marking probability linearly increases with the queue buffer length.

On a receive end side, when the data packet carrying the ECN identifier arrives at the receive-end NIC, it indicates that congestion occurs in a network, and the receive-end NIC returns a congestion notification packet (congestion notification packet, CNP) for the packet carrying the ECN identifier, to transfer congestion information to the transmit-end NIC by using the CNP. For example, if a data packet carrying an ECN identifier in a data flow arrives at the receive-end NIC, and no corresponding CNP is sent in a previous reference time period, the receive-end MC immediately sends a CNP. A length of the reference time period is N µs. A value of N may be configured as 0. In other words, the receive-end MC returns one CNP each time a packet carrying an ECN identifier is received.

A delay and a packet loss may occur for the CNP as a congestion control packet. A delay exists in each hop device and each link from the transmit end to the receive end. As a result, a time of receiving the CNP by the transmit end is prolonged. At the same time, congestion at the egress port of the switch also increases gradually. If the transmit end cannot reduce a speed in time, a packet loss may still occur. Therefore, on the transmit end side, the transmit-end NIC controls a transmit rate of each data flow For example, speed-up control is triggered for the data flow by using the received CNP, and speed-down control is triggered for the data flow by using a time timer and a byte counter. The speed-up control and the speed-down control are independent of each other.

It can be learned from the foregoing process that speed-up control of the DCQCN algorithm is triggered based on the timer of the transmit-end NIC, and speed-down control is triggered based on the CNP sent by the receive-end NIC. When the speed-up control and the speed-down control cannot work in coordination, DCQCN speed control failure occurs. Especially when a scale of the data flow in the network increases, the DCQCN speed control failure problem is more likely to occur.

For example, as a quantity of data flows increases, a bandwidth allocated to each data flow decreases accordingly, and a quantity of CNPs sent within a unit time also decreases accordingly. In this case, an interval between CNPs increases accordingly. For example, a bandwidth at the transmit end is limited to send two thousand data packets per second, and each interval between data packets is 500 µs. In this case, even if each data packet is marked with an ECN identifier, a minimum interval between CNPs returned by the receive end is 500 µs. However, a speed-up period of a DCQCN source is 300 µs. In this case, the interval between the CNPs is greater than the speed-up period. When the congestion occurs, speed up is still implemented for the data flow at the transmit end in a congestion status by mistake, causing a DCQCN speed control failure.

Figure 3:
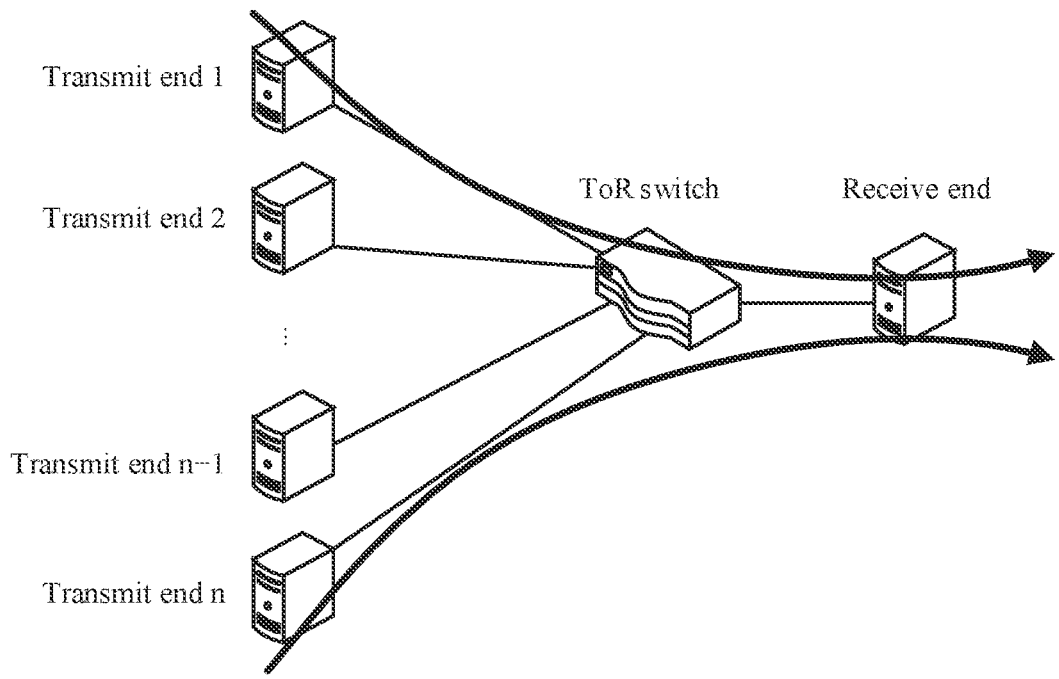
FIG. 3 is a schematic diagram of a flow model according to an embodiment of this application.
Figure 4:
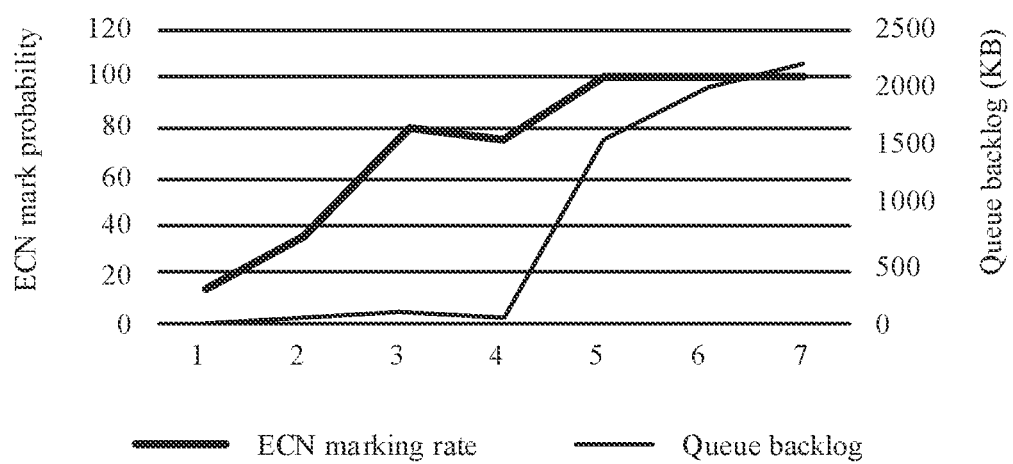
FIG. 4 is a schematic diagram of a relationship between an ECN marking rate and a queue backlog according to an embodiment of this application.

For example, in a data flow model shown in FIG. 3, a single top of rack (top of rack, ToR) switch implements data flow transmission from a plurality of transmit ends to one receive end, and a packet of the TCP protocol and a packet of the RoCE protocol are transmitted according to a bandwidth ratio of 9:1. FIG. 4 shows a relationship between a data flow quantity, an ECN, and a queue backlog. It can be learned from FIG. 4 that when the data flow quantity is relatively small, for example, when the data flow quantity is less than 4, the DCQCN works well. An ECN marking rate increases with an increase of the data flow quantity. A queue buffer length is controlled to be very small. A service delay is also very low. However, after the data flow quantity reaches a specific level, for example, after the data flow quantity shown in FIG. 4 exceeds 4, even if the ECN marking rate reaches 100%, the queue buffer length changes to an MB level, and the service delay deteriorates to an ms level. In this case, the ECN fails.

Figure 5:
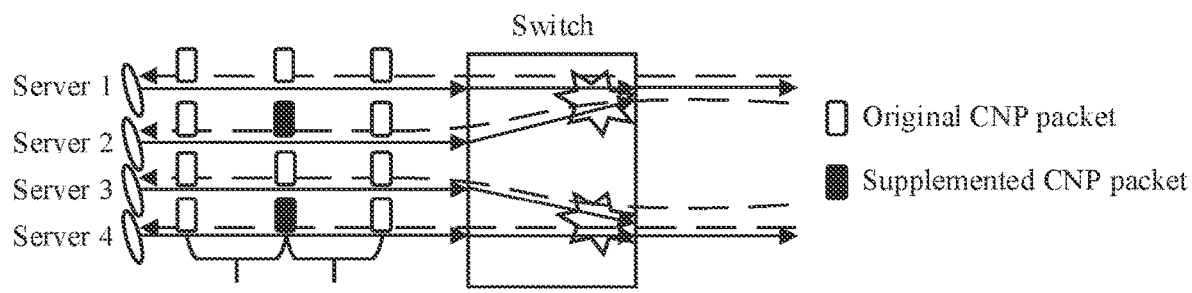
FIG. 5 is a schematic diagram of a flow transmission process according to an embodiment of this application.

To resolve the ECN failure problem, the related technologies further put forward a method for recording a congestion degree and a time of a received CNP at an egress port of a switch on a switch side and determining based on the congestion degree of the egress port of the switch whether to supplement a CNP. A schematic diagram of data flow transmission shown in FIG. 5 is used as an example. When the egress port of the switch enters the congestion status, the switch checks a time interval between CNPs of a data flow passing through the egress port. If no CNP passes in the speed-up period of the DCQCN, the switch side supplements a CNP, sends the CNP to the transmit end, and updates the time of the CNP. If a CNP passes in the speed-up period of the DCQCN, the switch only updates the time of the CNP and does not supplement a CNP. When the egress port of the switch is not congested, only the time of the CNP is updated, and the CNP is not supplemented.

However, in the foregoing manner of supplementing a CNP, a problem of a queue backlog and delay degradation still occurs with a further increase of data flows. For example, in a data flow model shown in FIG. 6, a single ToR switch implements data flow transmission from a plurality of transmit ends to one receive end, and a packet of the TCP protocol and a packet of the RoCE protocol are transmitted according to a bandwidth ratio of 9:1. A data flow quantity (qp quantity) of each server continuously increases. A relationship between the qp quantity of the server and a delay may be shown in a test result in FIG. 7. It may be learned that the delay is relatively low when a quantity of data flows output by each server is less than 9. However, when the quantity of data flows output by the server is greater than 9, the delay suddenly deteriorates to an ms level. Consequently, the CNP failure still exists in the solution.

Figure 8:
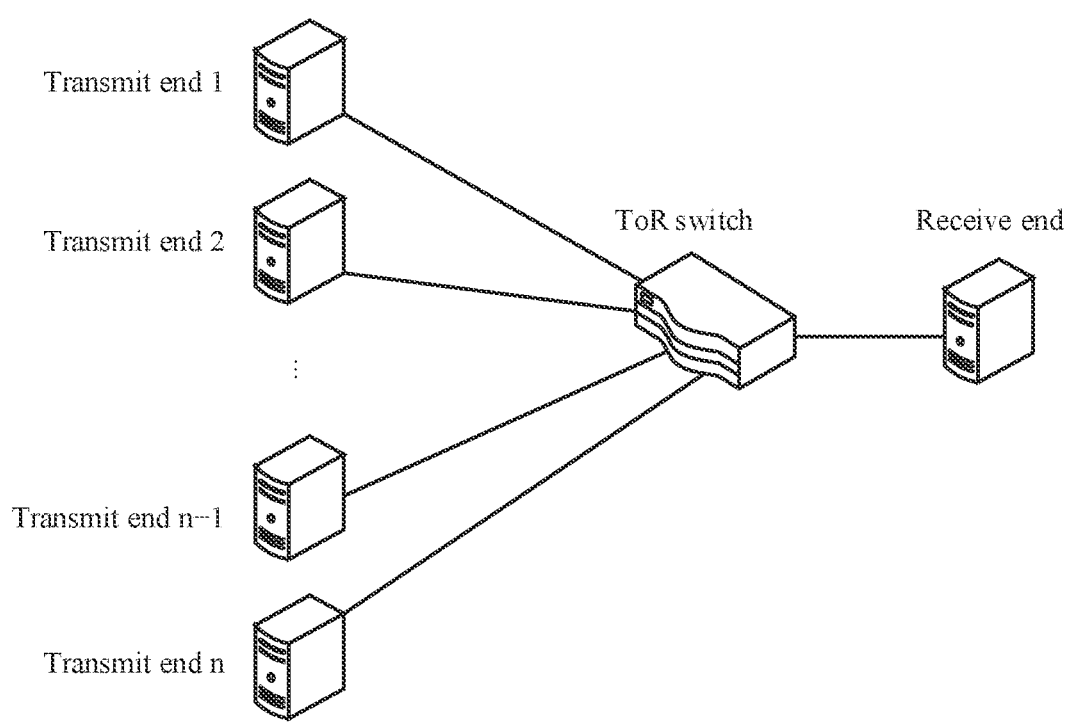
FIG. 8 is a schematic diagram of a flow model according to an embodiment of this application.
Figure 9:
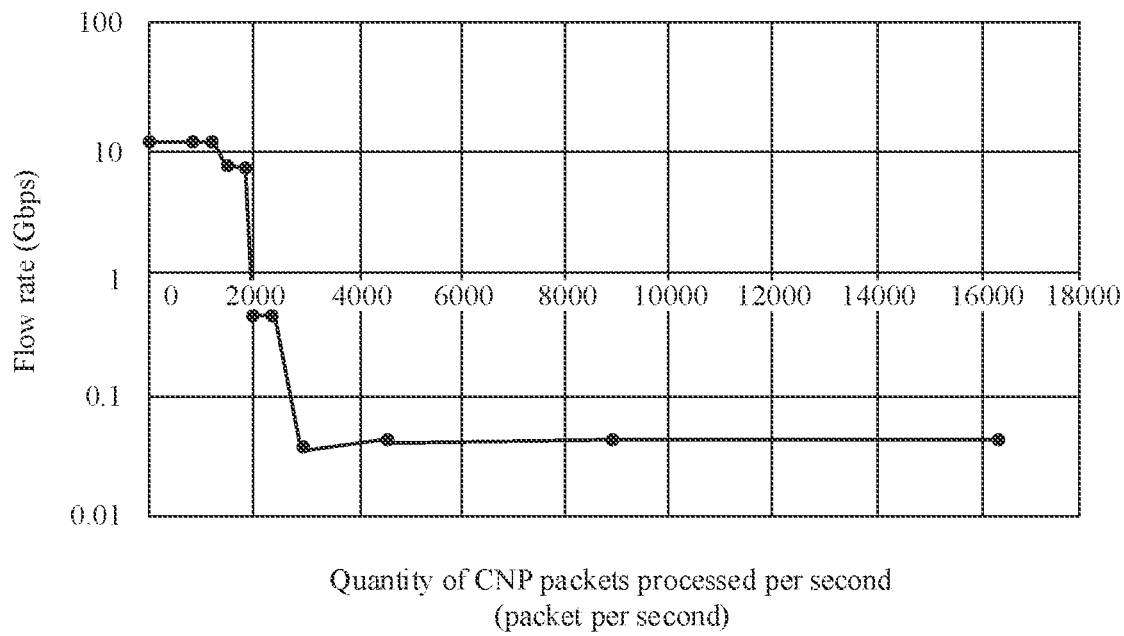
FIG. 9 is a schematic diagram of changes of a flow rate and a CNP quantity according to the related technologies.

For ease of understanding, the flow model shown in FIG. 8 is used for further analysis. As shown in FIG. 8, a transmit end 1 (sender1) and a transmit end 2 (sender2) in the flow model simultaneously send data flows to a receive end (receiver). The receiver may construct any quantity of CNPs for the sender1 and the sender2 according to a requirement. A relationship between a quantity of CNPs processed by the server per second and a flow rate may be shown in FIG. 9. A rate of the server decreases with an increase of a quantity of CNPs processed within a unit time. However, after the rate decreases to a specific value, the rate stops decreasing. This phenomenon is referred to as a CNP failure. Therefore, in a large-scale high-concurrency scenario, when a bandwidth allocated to each data flow is less than a limit value of speed control that can be implemented by a network adapter, a CNP failure inevitably occurs. In this case, a queue cannot be suppressed, and a service delay is very high.

Figure 6:
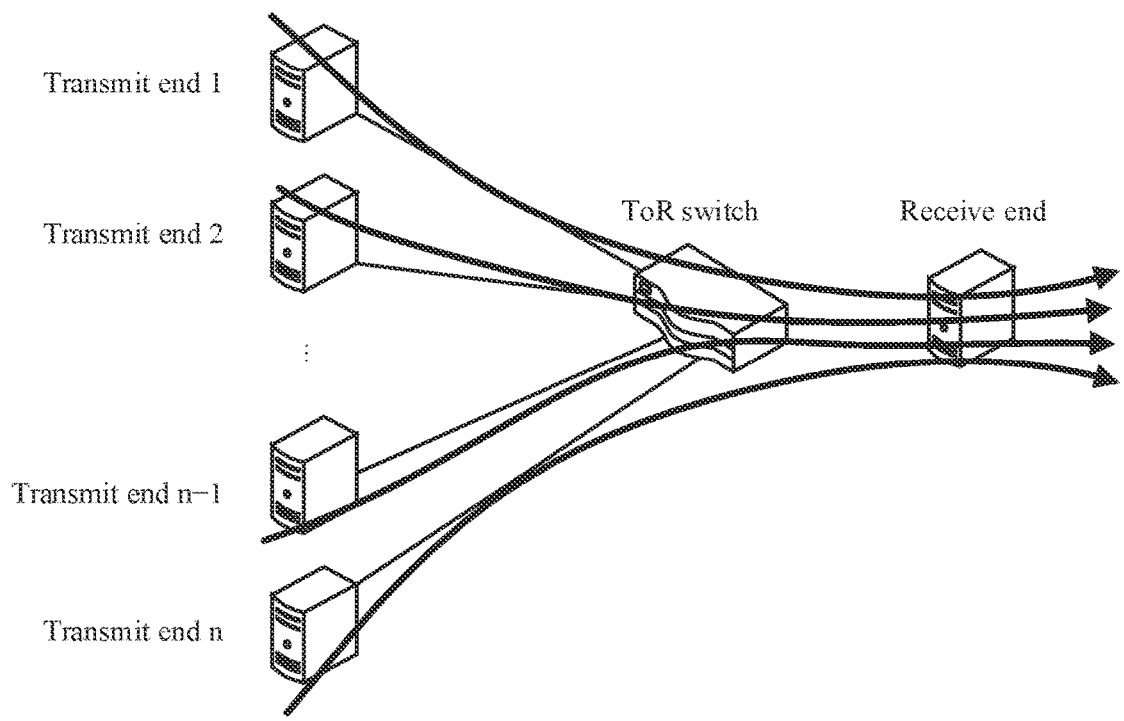
FIG. 6 is a schematic diagram of a flow model according to an embodiment of this application.
Figure 7:
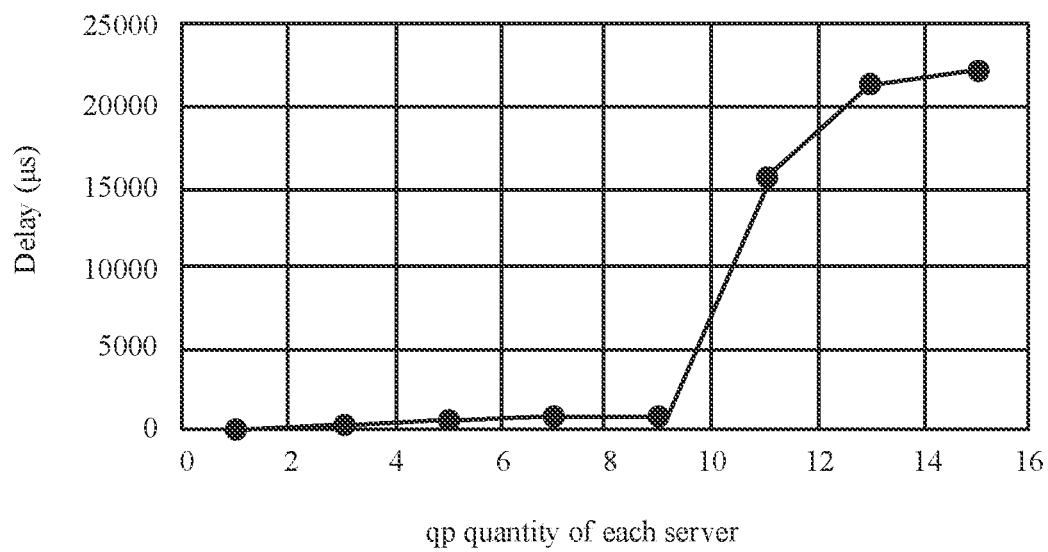
FIG. 7 is a schematic diagram of a relationship between a server qp quantity and a delay according to an embodiment of this application.

For example, a further test in the flow model shown in FIG. 6 is used as an example to obtain a test result shown in Table 1. It can be learned from the test result shown in Table 1 below that the CNP failure occurs in any ratio. In this case, the queue backlog is very large, and the service delay is very-high.

TABLE 1

| TCP:RoCE bandwidth ratio | Data flow quantity | Port backlog | Delay |
| --- | --- | --- | --- |
| 90:10 | 7*11 | 19446 kb | 31637.50 μs |
| 70:30 | 7*40 | 19757 kb | 10360.06 μs |
| 50:50 | 7*65 | 18845 kb | 5987.04 μs |
| 30:70 | 7*85 | 16829 kb | 3824.71 μs |
| 10:90 | 7*115 | 18160 kb | 3206.68 μs |

To resolve the CNP failure problem, that is, to resolve the DCQCN speed control failure problem in the large-scale high-concurrency scenario, an embodiment of this application provides a network congestion control method. In this method, a network congestion status is divided into three types: an ECN normal state, an ECN failure state, and a CNP failure state. A current network congestion status is recognized. A priority-based flow control (priority-based flow control, PFC) packet is generated in a path-level trigger manner based on a network congestion status. A flow is controlled by using a PFC packet, to suppress a queue backlog on a congestion side, ensure a low service delay without affecting a service throughput, and support large-scale RoCE networking.

Figure 10:
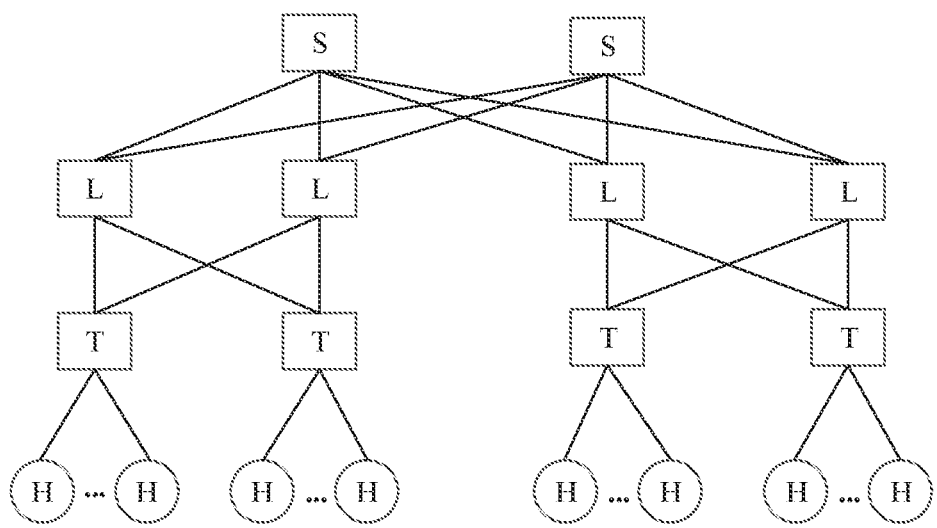
FIG. 10 is a schematic diagram of a structure of a data center network according to an embodiment of this application.

For example, the method provided in this embodiment of this application may be applied to a data center network shown in FIG. 10. The data center network has Clos network architecture. The Clos network architecture is switching architecture that can implement rearrangement, non-congestion, and scalability and that is used for high-performance computing, high-performance distributed storage, big data, artificial intelligence, and the like. The Clos network architecture includes a first switch, a second switch, and a source server. The first switch is a ToR switch represented by T shown in FIG. 10. The second switch is a ToR switch represented by T different from the first switch shown in FIG. 10. The source server is a server (Host) represented by H shown in FIG. 10. The first switch may serve as a source-end switch, the second switch may serve as a congestion-side switch, and the source server may serve as a network device corresponding to a flow source. Specific functions of each switch are as follows:

The second switch (T) is configured to read a queue length and a threshold range of a current ECN (for example, waterline values: kmin and kmax). If the queue length is near kmin-kmax, the network congestion status is recognized as the ECN normal state. If the queue length is far greater than kmax, the network congestion status is recognized as the ECN failure state, and the CNP is intelligently added. If the queue length is still far greater than kmax after the CNP is added, the network congestion status is recognized as the CNP failure state. The ECN failure state and the CNP failure state may be used as a target network congestion status. When the current network congestion status is the target network congestion status, the second switch constructs a target signaling packet, to indicate the source switch, that is, the first switch to currently enter the target network congestion status, for example, enter the CNP failure state to perform a PFC supplementation operation. For example, if the queue length is greater than a specified upper limit, the second switch constructs a first signaling packet and sends the first signaling packet to the first switch. For example, the first signaling packet is a CNP. The second switch fills a first feature value in a specified field such as a reserved (reserved) field of a frame header of the CNP, for example, 1. For example, if the queue length is less than a specified lower limit, the second switch constructs a second signaling packet and sends the second signaling packet to the first switch. For example, the first signaling packet is a CNP. The second switch fills a second feature value in a reserved field of a frame header of the CNP, for example, 2.

The first switch (T): The first switch receives and parses the target signaling packet that is sent by the second switch, and finds that a notified object is the first switch. If the reserved field is a first feature value 1, the target signaling packet is recognized as the first signaling packet, and the first switch constructs the first PFC packet and sends the first PFC packet to the corresponding source server (H), to trigger the corresponding source server to suspend sending a data packet of a target queue. For example, the first PFC packet constructed by the first switch is an XOFF PFC packet. If the reserved field is a second feature value 2, and the target signaling packet is recognized as the second signaling packet, the first switch constructs the second PFC packet and sends the second PFC packet to the corresponding source server, to trigger the corresponding source server to continue sending a data packet of a target queue. For example, the second PFC packet constructed by the first switch is an XON PFC packet. The target queue is one or more queues of the source server, and may be indicated by using a PFC packet. In addition, the first switch may also perform flow control by using a flow source port. For example, corresponding target flow control information is sent by using the flow source port to the source server corresponding to the flow source information, to indicate to suspend or continue sending a data packet of a queue corresponding to the flow source port.

In addition to the first switch and the second switch, in an example embodiment, the Clos network architecture further includes an intermediate switch between the first switch and the second switch. The intermediate switches are a leaf (Leaf) switch represented by L shown in FIG. 10 and a spine (Spine) switch represented by S shown in FIG. 10.

For the intermediate switches (L and S), the intermediate switch receives and parses the target signaling packet that is sent by the second switch. If a notified object is not the intermediate switch, the intermediate switch does not perform a special operation, and continues forwarding the target signaling packet.

It should be noted that the quantity of switches shown in FIG. 10 is merely an example for description. This embodiment of this application sets no limitation on a quantity of switches. In addition, the source server is merely an example of the network device corresponding to the flow source. In addition to the source server, the source server may be another switch. A type of the network device corresponding to the flow source is not limited in this embodiment of this application. In addition, the method provided in this embodiment of this application is not limited to the data center network scenario shown in FIG. 10, but may also be applied to another scenario in which the DCQCN technology is used. This embodiment of this application does not limit an application scenario.

Figure 11:
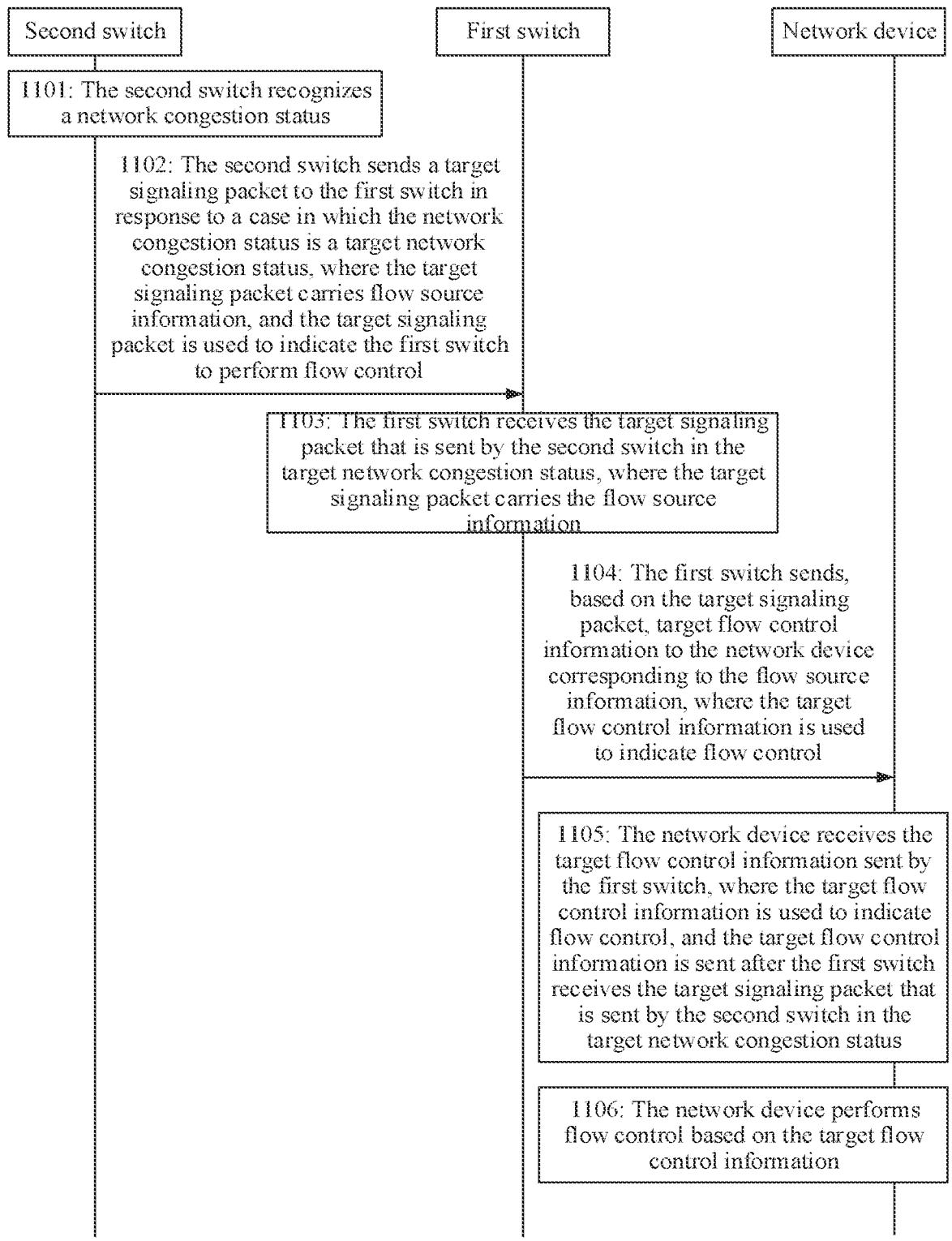
FIG. 11 is a flowchart of a network congestion control method according to an embodiment of this application.

Next, a network congestion control method according to an embodiment of this application is described. The method may be implemented through interaction between a first switch, a second switch, and a network device corresponding to a flow source. For example, the network device is a source server. As shown in FIG. 11, the method provided in this embodiment of this application includes the following steps:

1101: The second switch recognizes a network congestion status.

In an example embodiment, the second switch recognizes the network congestion status. This process includes but is not limited to the following two processes: 1101A and 1101B.

1101A: Read a current queue length and a threshold range of an ECN. The threshold range of the ECN is used to indicate a probability of adding an ECN identifier. The ECN identifier is used to indicate that congestion occurs in a network.

In an example embodiment, the second switch is a switch for detecting congestion. The current queue length is a queue length of current buffered data of an egress port of the second switch. When a data packet arrives at the egress port of the switch, the second switch checks a queue length of the buffered data of the egress port of the second switch. If the queue length of the buffered data of the egress end of the second switch exceeds a specified threshold, the data packet is marked with an ECN identifier according to a marking probability. Therefore, the ECN identifier can be used to indicate network congestion. In this embodiment of this application, a magnitude of a specified threshold is not limited, for example, may be set based on an application scenario, or may be set based on experience.

When the data packet is marked with the ECN identifier, the marking probability is determined based on the threshold range of the ECN and the queue length. For example, as shown in the ECN marking model shown in FIG. 2, the threshold range of the ECN is a range formed between a specified lower limit threshold kmin and a specified upper limit threshold kmax. The threshold range of the ECN is used to indicate a probability of adding an ECN identifier. More severe network congestion indicates a larger quantity of packets with ECN identifiers.

Figure 12:
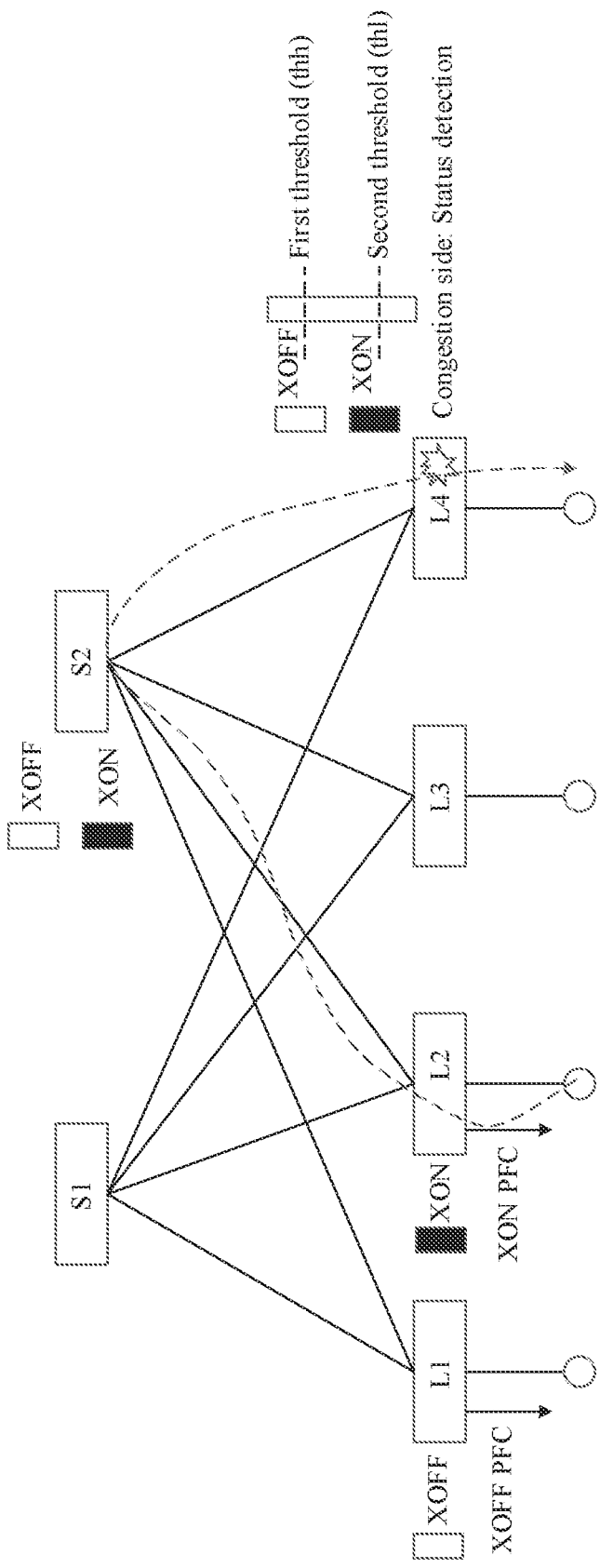
FIG. 12 is a schematic diagram of an application scenario according to an embodiment of us application.

In the method provided in this embodiment of this application, the network congestion status is recognized based on the current queue length and the threshold range of the ECN. For ease of understanding, the method is applied to an application scenario shown in FIG. 12. As shown in FIG. 12, network architecture includes four L switches: respectively a switch L1, a switch L2, a switch L3, and a switch L4; and includes two S switches: respectively a switch S1 and a switch S2. In an example in which congestion occurs on a side of the switch L4, the switch L4 is the second switch. The current queue length, and the kmin value and the kmax value of the current ECN are read.

1101B: The second switch recognizes the network congestion status based on the current queue length and the threshold range of the ECN.

For example, the network congestion status includes but is not limited to an ECN normal state, an ECN failure state, and a congestion notification packet CNP failure state.

In an example embodiment, recognizing the network congestion status based on the current queue length and the threshold range of the ECN includes but is not limited to the following three recognition results:

For a recognition result 1, in response to the current queue length within a reference range, the network congestion status is the ECN normal state.

The reference range is not limited in this embodiment of this application. The reference range may be set based on experience, or may be adjusted based on an application scenario. For example, the reference range is determined based on the threshold range of the ECN. A range between 0 and 1.5 times the maximum value kmax is used as the reference range. If the current queue length falls within the reference range of 0 to 1.5 kmax, the network congestion status is the ECN normal state.

For a recognition result 2, in response to the current queue length greater than the maximum value in the reference range, when the CNP is not supplemented, the network congestion status is the ECN failure state.

For example, the range between 0 and 1.5 times the maximum value kmax is still used as the reference range. The maximum value in the reference range is 1.5 kmax. If the current queue length is greater than 1.5 kmax and the CNP is not supplemented, the network congestion status is the ECN failure state. For a case in which the recognition result is the network congestion status as the ECN failure state, the second switch may supplement the CNP. For example, a congestion degree and a time of a received CNP at an egress port of the second switch are recorded on a second switch side, and whether to supplement a CNP is determined based on the congestion degree of the egress port of the second switch. For a manner of supplementing a CNP, refer to the related description about FIG. 5. Details are not described herein again.

For a recognition result 3, in response to the current queue length greater than the maximum value in the reference range, when the CNP is supplemented, the network congestion status is the CNP failure state.

For example, the range between 0 and 1.5 times the maximum value kmax is still used as the reference range. The maximum value in the reference range is 1.5 kmax. If the current queue length is greater than 1.5 kmax and the CNP is supplemented, the network congestion status is the CNP failure state.

In conclusion, in an application scenario shown in FIG. 12 in an example, congestion occurs in the switch L4. After the current queue length and the values: kmin and kmax of the current ECN are read, if the current queue length is near the reference range between kmin and kmax, for example, the reference range is [0, 1.5*kmax], the switch L4 recognizes that the current network congestion status is the ECN normal state. If the queue length is far greater than 1.5 kmax, for example, greater than 3*kmax, and the CNP is not supplemented, the switch L4 recognizes that the current network congestion status is the ECN failure state, and enables an intelligent CNP supplementation function. If the queue length is far greater than 1.5 kmax, for example, greater than 3*kmax, the switch L4 recognizes that the current network congestion status is the CNP failure state.

1102: The second switch sends a target signaling packet to the first switch in response to a case in which the network congestion status is the target network congestion status. The target signaling packet carries flow source information. The target signaling packet is used to indicate the first switch to perform flow control.

In an example embodiment, the target signaling packet includes a first signaling packet or a second signaling packet. Sending the target signaling packet to the first switch in response to the case in which the network congestion status is the target network congestion status includes but is not limited to the following two sending cases:

In a sending case 1, the first signaling packet is sent to the first switch in response to a case in which the network congestion status is the target network congestion status and the current queue length is greater than a first threshold. The first signaling packet is used to indicate the first switch to send first flow control information. The first flow control information is used to indicate the network device corresponding to the flow source information to suspend sending a data packet of a target queue. The target queue is one or more queues of the network device.

For the sending case 1, a magnitude of the first threshold may be set based on experience, may be set based on an application scenario, or may be adjusted in a method implementation process. The current queue length is greater than the first threshold. It indicates that the congestion status is relatively serious, and flow control needs to be started. For example, the first signaling packet is used to indicate the first switch to perform first-type flow control, that is, indicate the first switch to send the first flow control information. The first signaling packet may be a packet in any format, to indicate the first switch to perform the first-type flow control.

For example, before the first signaling packet is sent to the first switch, the method further includes: obtaining a first CNP, setting a value of a specified field in a frame header of the first CNP to a first feature value, and using the first CNP as the first signaling packet.

A format of the CNP is shown in Table 2 as an example. A first row in Table 2 shows a quantity of bits of each field. A second row shows a name of each field. A third row shows a value of each field. The frame header of the CNP includes an 8-bit operation code (pocode) field, a 1-bit solicited event (solicited event, SE) field, a 1-bit migration request (migreq, M) field, a 2-bit pad count (Pad Count) field, a 4-bit head version (Head version) field, a 16-bit partition key (Partition Key, P_KEY) field, an 8-bit reserved (Reserved) field, a 24-bit destination queue pair (DestQP) field, a 1-bit acknowledgement request (Ack request) field, a 7-bit reserved field, and a 24-bit packet sequence number (packet sequence number, PSN) field.

TABLE 2

| 8 | 1 | 1 | 2 | 4 | 16 | 8 | 24 | 1 | 7 | 24 |
|---|---|---|---|---|---|---|---|---|---|---|
| pocode | SE | M | Pad Count | Head version | P_KEY | Reserved | DestQP | Ack request | Reserved | PSN |
| 0x81 | 0 | 0 | 00 | 0000 | 0xffff | 01000000 | DQP | 0 | | All 0 |

In this embodiment of this application, a value of a second reserved field of the CNP, that is, a 7-bit reserved field, is set to the first feature value. For example, based on the frame header of the CNP shown in Table 2, the value of the 7-bit reserved field in the frame header of the CNP is set to the first feature value. For example, the first feature value is 1, and is represented by 0000001. A frame header of the CNP is shown in Table 3.

TABLE 3

| 8 | 1 | 1 | 2 | 4 | 16 | 8 | 24 | 1 | 7 | 24 |
|---|---|---|---|---|---|---|---|---|---|---|
| pocode | SE | M | Pad Count | Head version | P_KEY | Reserved | DestQP | Ack request | Reserved | PSN |
| 0x81 | 0 | 0 | 00 | 0000 | 0xffff | 01000000 | DQP | 0 | 0000001 | All 0 |

In a sending case 2, the second signaling packet is sent to the first switch in response to a case in which the network congestion status is the target network congestion status and the current queue length is less than a second threshold. The second signaling packet is used to indicate the first switch to send second flow control information. The second flow control information is used to indicate the network device to continue sending a data packet of a target queue. The second threshold is less than the first threshold.

For the sending case 2, a magnitude of the second threshold may be set based on experience, may be set based on an application scenario, or may be adjusted in a method implementation process. The second threshold is less than the first threshold. The current queue length is less than the second threshold, to indicate that congestion is alleviated and another type of flow control needs to be enabled. For example, the second signaling packet is used to indicate the first switch to perform second-type flow control. The second signaling packet may be a packet in any format, to indicate the first switch to perform the second-type flow control.

For example, before the second signaling packet is sent to the first switch, the method further includes: obtaining a second CNP, setting a value of a specified field in a frame header of the second CNP to the second feature value, and using the second CNP as the second signaling packet.

Still in an example of the format of the frame header of the CNP shown in Table 2, the value of the 7-bit reserved field in the frame header of the CNP is set to the second feature value. For example, the second feature value is 2, and is represented by 0000010. A frame header of the CNP is shown in Table 4.

TABLE 4

| 8 | 1 | 1 | 2 | 4 | 16 | 8 | 24 | 1 | 7 | 24 |
|---|---|---|---|---|---|---|---|---|---|---|
| pocode | SE | M | Pad Count | Head version | P_KEY | Reserved | DestQP | Ack request | Reserved | PSN |
| 0x81 | 0 | 0 | 00 | 0000 | 0xffff | 01000000 | DQP | 0 | 0000010 | All 0 |

Still in an example of the application scenario shown in FIG. 12, when the switch L4 recognizes the current network congestion status as the target network congestion status, the switch L4 compares the current queue length with specified limits: a first threshold thh and a second threshold thl. If the current queue length is greater than thh, the switch L4 constructs the first signaling packet and sends the first signaling packet to the first switch. For example, the CNP is used as a signaling packet. The feature value 1 is filled in the reserved field in the frame header of the CNP. If the current queue length is less than thl, the switch L4 constructs the second signaling packet and sends the second signaling packet to the first switch. For example, the CNP is used as a signaling packet. The feature value 2 is filled in the reserved field in the frame header of the CNP. The reserved field in the frame header of the CNP is a reserved field, which is all 0 by default. In this embodiment of this application, the reserved field is used to construct the first signaling packet and the second signaling packet. The first switch is notified of different actions. In other words, different flow control manners are used.

In an example embodiment, the target network congestion status includes an ECN failure state or a CNP failure state. The ECN failure state is a state in which a current queue length of the second switch is greater than a maximum value in a reference range and a CNP is not supplemented. The CNP failure state is the state in which the current queue length of the second switch is greater than the maximum value in the reference range and a CNP is supplemented.

1103: The first switch receives a target signaling packet that is sent by the second switch in the target network congestion status. The target signaling packet carries flow source information.

In an example embodiment, for two cases in which the second switch sends the target signaling packet in step 1102, that the first switch receives the target signaling packet that is sent by the second switch in the target network congestion status includes but is not limited to the following two receiving cases:

In a receiving case 1, the first signaling packet that is sent by the second switch in the target network congestion status is received. The first signaling packet is used to indicate the first switch to send the first flow control information and perform first-type flow control.

For example, receiving the first signaling packet that is sent by the second switch in the target network congestion status includes: receiving a first CNP that is sent by the second switch in the target network congestion status. A value of a specific field in a frame header of the first CNP is the first feature value. The first feature value is used to indicate to send the first flow control information.

In a receiving case 2, the second signaling packet that is sent by the second switch in the target network congestion status is received. The second signaling packet is used to indicate the first switch to send the second flow control information and perform second-type flow control.

For example, receiving the second signaling packet that is sent by the second switch in the target network congestion status includes: receiving a second congestion notification packet CNP that is sent by the second switch in the target network congestion status. The value of the specific field in the frame header of the second CNP is the second feature value. The second feature value is used to indicate to send the second flow control information.

1104: The first switch sends, based on the target signaling packet, target flow control information to a network device corresponding to the flow source information. The target flow control information is used to indicate flow control.

In an example embodiment, that the first switch sends, based on the target signaling packet, the target flow control information to the network device corresponding to the flow source information includes but is not limited to the following two cases:

In a case 1, the first flow control information is sent, based on the target signaling packet, to the network device corresponding to the flow source information. The first flow control information is used to indicate the network device to suspend sending a data packet of a target queue. The target queue is one or more queues of the network device.

For example, sending, based on the target signaling packet, the first flow control information to the network device corresponding to the flow source information includes: constructing a first PFC packet based on the target signaling packet, where a value of a time field of the first PFC packet is a first value, and the first value is used to indicate the first flow control information; and sending the first PFC packet to the network device corresponding to the flow source information.

In a case 2, the second flow control information is sent, based on the target signaling packet, to the network device corresponding to the flow source information. The second flow control information is used to indicate the network device to continue sending a data packet of a target queue. The target queue is one or more queues of the network device.

For example, sending, based on the target signaling packet, the second flow control information to the network device corresponding to the flow source information includes: constructing a second priority-based flow control PFC packet based on the target signaling packet, where a value of a time field of the second PFC packet is a second value, and the second value is used to indicate the second flow control information; and sending the second PFC packet to the network device corresponding to the flow source information.

The PFC is a technology in an IEEE data center bridge (Data Center Bridge, DCB) protocol family, and is an enhanced version of flow control. In the method provided in this embodiment of this application, after the network congestion status is recognized as the CNP failure state, the first switch is triggered to send the corresponding PFC packet to the network device corresponding to flow source information, to perform flow control.

For example, as shown in Table 3, if the reserved field of the target signaling packet received by the first switch is 00000001, it indicates that the target signaling packet received by the first switch is the first signaling packet, and the first switch needs to send the first PFC packet to the corresponding network device. For example, the first PFC packet includes but is not limited to an XOFF PFC packet. If the reserved field of the target signaling packet received by the first switch is 00000010, it indicates that the target signaling packet received by the first switch is the second signaling packet, and the first switch needs to send the second PFC packet to the corresponding network device. For example, the second PFC packet includes but is not limited to an XON PFC packet.

XON/XOFF is a software data flow communications protocol for controlling data flows between a computer and another device. Herein, X represents a transmitter. XON/XOFF is usually referred to as "software flow control". Typically, when the receiver cannot receive any more data (for example, the receiver may take time to handle some things), the receiver sends one XOFF character to the transmitter. Once the receiver can receive more data again, the receiver sends one XON character to the transmitter. In this embodiment of this application, the XON/XOFF PFC packet is used as a flow control packet, to implement priority-based flow control. For example, a format of the PFC packet is shown in Table 5.

TABLE 5

| Field name | Meaning |
| --- | --- |
| Destination MAC address (Destination Mac Address) | Destination MAC address field, 6 bytes, required to be 01-80-C2-00-00-01 |
| Source MAC address (Source Mac Address) | Source MAC address domain, 6 bytes, a MAC address of a device |
| Type (type)/Length (len) | Ethernet frame length or type field, required to be 88-08 and used to indicate that a type of this frame is a MAC control frame. |
| Control operation code (control opcode) | MAC control operation code, 2 bytes, where a PFC frame (packet) is merely one type of a MAC control frame, and for the PFC frame, operation code of the PFC frame in the MAC control frame is 01-01 |
| Priority_enable_vector (Priority_enable_vector) | 2 bytes, where a high byte is set to 0, and each bit of a low byte indicates that corresponding time[n] is valid, and when e[n] is 0, it indicates that time[n] is invalid |
| Time (time) | Eight array units from time[0] to time[7] are included, and each array unit is 2 bytes. When e[n] is 0, time[n] is meaningless. When e[n] is 1, time[n] represents a time in which a receive station suppresses sending a packet with a priority of n, and a time unit is a time required by a physical layer chip for sending 512-bit data. Therefore, a PFC PAUSEI frame is sent once, and a time length in which a peer device suspends sending is required to be at most 65535 × the time required by the physical layer chip for sending the 512-bit data |

The application scenario shown in FIG. 12 is still used as an example. The intermediate switch receives and parses the target signaling packet. If the notified object is not the intermediate switch, the intermediate switch performs no special operation, and continues forwarding the target signaling packet.

For example, the switch L1 receives the target signaling packet, extracts the reserved field from the frame header, and parses the reserved field. If the reserved field is found to be the feature value 1, the PFC packet in the format shown in Table 5 is constructed and sent to the corresponding network device, for example, a source server. Then, the target signaling packet may be discarded. The time[n] field of the PFC packet is 65535, and is used to indicate to suspend sending a data packet of a target queue n within the time indicated by 65535.

For another example, the first switch L2 receives the target signaling packet, extracts the reserved field from the frame header, and parses the reserved field. If the reserved field is found to be the feature value 2, the PFC packet in the format shown in Table 5 is constructed and sent to the corresponding network device, for example, the source server. Then, the target signaling packet is discarded. The time[n] field of the PFC packet is 0, and is used to indicate to continue sending a data packet of the target queue n.

It should be noted that, because the PFC is a priority-based flow control packet, the Priority_enable_vector field e[n] indicates whether the time value of the queue with a priority of n is valid. For example, the network device has queues with n priorities. If the network device needs to suspend sending data packets in all the queues, the target queue includes n queues, values of e[1] to e[n] are not 0, and time values are set based on suspension times. If the network device needs to suspend sending data packets in some queues, for example, the target queue includes one queue, a value of e[n] corresponding to a queue with a priority of the target queue is not 0, and a time value is set based on a suspension time.

In the foregoing manner, the first switch sends the target flow control information to the network device to indicate the network device to suspend or continue sending the data packet of the target queue. The first switch may not specify the target queue, and merely use the target flow control information to indicate the network device to suspend or continue sending the data packet, so that the network device determines to suspend or send a data packet of a queue.

In addition, the foregoing process in this embodiment of this application is described as an example merely in a manner of constructing the PFC packet to carry the target flow control information. In addition to the PFC packet, a PAUSE packet may also be used. A type of a packet carrying the target flow control information is not limited in this embodiment of this application.

The PAUSE packet is a packet used to control a MAC data flow. When a peer end has an excessively large data volume, and data cannot be processed in time, a PAUSE packet is sent to upstream MAC of the data (the network device corresponding to the flow source in this embodiment of this application), to indicate the upstream MAC to stop sending data within a time period. A stop time is recorded in a PAUSE_TIMING field of the PAUSE packet. In other words, the PAUSE_TIMING field in which the stop time is recorded is used to carry the target flow control information. When receiving a valid PAUSE packet from the peer end, the upstream MAC starts timing, and stops sending data, to avoid a case in which the peer end cannot process data in time thereby causing a FIFO overflow or a data loss at the peer end. If the timing ends and no new PAUSE packet is received, the data is sent again. If the timing does not end and the PAUSE_TIMING field of the newly received PAUSE packet is all 0, it indicates that the data can be sent again. In this case, the timing stops and the data is sent again.

In an example embodiment, that the first switch sends, based on the target signaling packet, the target flow control information to the network device corresponding to the flow source information includes: determining a flow source port based on the flow source information carried in the target signaling packet; and sending, by using the flow source port, the target flow control information to the network device corresponding to the flow source information.

For example, the sending, by using the flow source port, the target flow control information to the network device corresponding to the flow source information includes: sending, by using the flow source port, third flow control information to the network device corresponding to the flow source information. The third flow control information is used to indicate to suspend sending a data packet of a queue corresponding to the flow source port. In this case, sending data packets of all queues corresponding to the flow source port is controlled to be suspended based on the third flow control information, to implement port-level control. This embodiment of this application does not limit a manner of sending the third flow control information. For example, the PAUSE packet is sent to the network device corresponding to the flow source information, and the PAUSE packet is used to carry the third flow control information, to indicate that sending the data packet of the queue corresponding to the flow source port is suspended. For example, a value of the PAUSE_TIMING field of the PAUSE packet is set to be not 0, to carry the third flow control information to indicate to suspend sending a data packet within a time indicated by the field.

For example, the sending, by using the flow source port, the target flow control information to the network device corresponding to the flow source information includes: sending, by using the flow source port, fourth flow control information to the network device corresponding to the flow source information. The fourth flow control information is used to indicate to continue sending a data packet of a queue corresponding to the flow source port. In this case, sending data packets of all queues corresponding to the flow source port is controlled to be continued based on the fourth flow control information, to implement port-level control. This embodiment of this application does not limit a manner of sending the fourth flow control information. For example, the PAUSE packet is sent to the network device corresponding to the flow source information, and the PAUSE packet is used to carry the fourth flow control information, to indicate that sending the data packet of the queue corresponding to the flow source port is continued. For example, the value of the PAUSE_TIMING field of the PAUSE packet is set to 0, to carry the fourth flow control information to indicate to continue sending a data packet.

An interaction process between the first switch and the network device corresponding to the flow source information is used as an example. As shown in FIG. 11, the network congestion control method includes the following several processes:

1105: The network device receives the target flow control information sent by the first switch. The target flow control information is used to indicate flow control. The target flow control information is sent after the first switch receives the target signaling packet that is sent by the second switch in the target network congestion status.

In an example embodiment, receiving the target flow control information sent by the first switch includes but is not limited to the following two cases:

In a case 1, the first flow control information sent by the first switch is received. The first flow control information is used to indicate to suspend sending a data packet of a target queue. The target queue is one or more queues of the network device.

For example, receiving the first flow control information sent by the first switch includes: receiving the first PFC packet sent by the first switch. A value of a time field of the first PFC packet is a first value. The first value is used to indicate the first flow control information.

In a case 2, second flow control information sent by the first switch is received. The second flow control information is used to indicate to continue sending a data packet of a target queue. The target queue is one or more queues of the network device.

For example, receiving the second flow control information sent by the first switch includes: receiving the second PFC packet sent by the first switch. A value of a time field of the second PFC packet is a second value. The second value is used to indicate the second flow control information.

1106: The network device performs flow control based on the tar get flow control information.

In an example embodiment, flow control is performed based on the target flow control information. This process includes but is not limited to the following two control manners:

In a control manner 1, sending the data packet of the target queue is suspended based on the first flow control information.

For example, suspending, based on the first flow control information, sending the data packet of the target queue includes: determining, based on the value of the time field of the first PFC packet, duration of suspending sending the data packet, and suspending sending the data packet of the target queue within the duration.

In a control manner 2, sending the data packet of the target queue is continued based on the second flow control information.

For example, continuing, based on the second flow control information, sending the data packet of the target queue includes: continuing, based on the value of the time field of the second PFC packet, sending the data packet of the target queue.

Network congestion control is performed by using the method provided in this embodiment of this application. For the CNP failure state, the method provided in this embodiment of this application is compared with a related technology of supplementing a CNP. An obtained test result is shown in Table 6.

TABLE 6

| TCP:RoCE bandwidth ratio | Data flow quantity | Port stock in related technologies | Delay in related technologies | Port stock in embodiments of this application | Delay in embodiments of this application |
|---|---|---|---|---|---|
| 90:10 | 7*11 | 19446 kb | 31637.50 μs | 62 kb | 687 μs |
| 70:30 | 7*40 | 19757 kb | 10360.06 μs | 68 kb | 727 μs |
| 50:50 | 7*65 | 18845 kb | 5987.04 μs | 53 kb | 713 μs |
| 30:70 | 7*85 | 16829 kb | 3824.71 μs | 70 kb | 661.57 μs |
| 10:90 | 7*115 | 18160 kb | 3206.68 μs | 81 kb | 655.78 μs |

It can be learned from the test result in the CNP failure scenario shown in Table 6 that, in the method provided in this embodiment of this application, order-of-magnitude optimization is implemented in both port backlog and a service delay, and a throughput is almost unaffected.

In the method provided in this embodiment of this application, the network congestion status is recognized. In the CNP failure state, the first switch is indicated by using the signaling packet to perform flow control, to suppress a queue backlog on a congestion side and ensure a low service delay, without affecting a service throughput. In this way, large-scale RoCE networking can be supported, thereby resolving a CNP failure problem and resolving a DCQCN speed control failure problem in a large-scale high-concurrency scenario.

Figure 13:
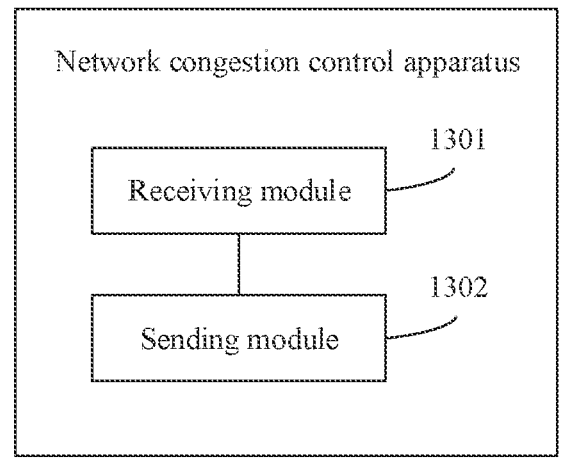
FIG. 13 is a schematic diagram of a structure of a network congestion control apparatus according to an embodiment of this application.

An embodiment of this application provides a network congestion control apparatus. The apparatus is configured to execute a function executed by a first switch in the network congestion control method shown in FIG. 11. With reference to FIG. 13, the apparatus includes:

a receiving module 1301, configured to receive a target signaling packet that is sent by a second switch in a target network congestion status, where the target signaling packet carries flow source information; and a sending module 1302, configured to send, based on the target signaling packet, target flow control information to a network device corresponding to the flow source information, where the target flow control information is used to indicate flow control.

In an example embodiment, the sending module 1302 is configured to: send, based on the target signaling packet, first flow control information to the network device corresponding to the flow source information. The first flow control information is used to indicate the network device to suspend sending a data packet of a target queue. The target queue is one or more queues of the network device.

In an example embodiment, the sending module 1302 is configured to: construct a first priority-based flow control PFC packet based on the target signaling packet, where a value of a time field of the first PFC packet is a first value, and the first value is used to indicate the first flow control information; and send the first PFC packet to the network device corresponding to the flow source information.

In an example embodiment, the receiving module 1301 is configured to receive a first signaling packet that is sent by the second switch in the target network congestion status. The first signaling packet is used to indicate to send the first flow control information.

In an example embodiment, the receiving module 1301 is configured to receive a first congestion notification packet CNP that is sent by the second switch in the target network congestion status. A value of a specific field in a frame header of the first CNP is a first feature value. The first feature value is used to indicate to send the first flow control information.

In an example embodiment, the sending module 1302 is configured to: send, based on the target signaling packet, second flow control information to the network device corresponding to the flow source information. The second flow control information is used to indicate the network device to continue sending a data packet of a target queue. The target queue is one or more queues of the network device.

In an example embodiment, the sending module 1302 is configured to: construct a second priority-based flow control PFC packet based on the target signaling packet, where a value of a time field of the second PFC packet is a second value, and the second value is used to indicate the second flow control information; and send the second PFC packet to the network device corresponding to the flow source information.

In an example embodiment, the receiving module 1301 is configured to receive a second signaling packet that is sent by the second switch in the target network congestion status. The second signaling packet is used to indicate to send the second flow control information.

In an example embodiment, the receiving module 1301 is configured to receive a second congestion notification packet CNP that is sent by, the second switch in the target network congestion status. A value of a specific field in a frame header of the second CNP is a second feature value. The second feature value is used to indicate to send the second flow control information.

In an example embodiment, the sending module 1302 is configured to: determine a flow source port based on the flow source information carried in the target signaling packet; and send, by using the flow source port, the target flow control information to the network device corresponding to the flow source information.

In an example embodiment, the sending module 1302 is configured to send, by using the flow source port, third flow control information to the network device corresponding to the flow source information. The third flow control information is used to indicate to suspend sending a data packet of a queue corresponding to the flow source port.

In an example embodiment, the sending module 1302 is configured to send, by using the flow source port, fourth flow control information to the network device corresponding to the flow source information. The fourth flow control information is used to indicate to continue sending a data packet of a queue corresponding to the flow source port.

For the apparatus provided in this embodiment of this application, after the target signaling packet that is sent by the second switch in the target network congestion status is received, the target flow control information is sent to the network device corresponding to the flow source information cared in the target signaling packet, to indicate flow control, suppress a queue backlog on a congestion side, and ensure a low service delay, without affecting a service throughput. In this way, large-scale RoCE networking can be supported, thereby resolving a DCQCN speed control failure problem in a large-scale high-concurrency scenario.

Figure 14:
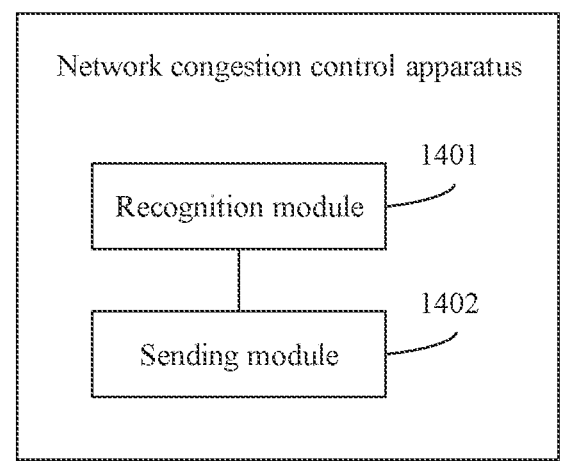
FIG. 14 is a schematic diagram of a structure of a network congestion control apparatus according to an embodiment of this application.

An embodiment of this application provides a network congestion control apparatus. The apparatus is configured to execute a function executed by a second switch in the network congestion control method shown in FIG. 11. With reference to FIG. 14, the apparatus includes:

a recognizing module 1401, configured to recognize a network congestion status; and a sending module 1402, configured to send a target signaling packet to a first switch in response to a case in which the network congestion status is a target network congestion status, where the target signaling packet carries flow source information, and the target signaling packet is used to indicate the first switch to perform flow control.

In an example embodiment, the target signaling packet includes a first signaling packet or a second signaling packet. The sending module 1402 is configured to: send the first signaling packet to the first switch in response to a case in which the network congestion status is the target network congestion status and a current queue length is greater than a first threshold, where the first signaling packet is used to indicate the first switch to send first flow control information, the first flow control information is used to indicate a network device corresponding to the flow source information to suspend sending a data packet of a target queue, and the target queue is one or more queues of the network device; or send the second signaling packet to the first switch in response to a case in which the network congestion status is the target network congestion status and a current queue length is less than a second threshold, where the second signaling packet is used to indicate the first switch to send second flow control information, the second flow control information is used to indicate the network device to continue sending a data packet of a target queue, and the second threshold is less than a first threshold.

In an example embodiment, the apparatus further includes:

an obtaining module, configured to: obtain a first CNP, set a value of a specified field in a frame header of the first CNP to a first feature value, and use the first CNP as the first signaling packet; or
   an obtaining module, configured to: obtain a second CNP, set a value of a specified field in a frame header of the second CNP to a second feature value, and use the second CNP as the second signaling packet.

In an example embodiment, the recognizing module 1401 is configured to: read a current queue length and an explicit congestion notification ECN threshold range, where the ECN threshold range is used to indicate a probability of adding an ECN identifier, and the ECN identifier is used to indicate that congestion occurs in a network; and recognize the network congestion status based on the current queue length and the ECN threshold range.

For the apparatus provided in this embodiment of this application, the network congestion status is recognized. In the target network congestion status, the first switch is indicated by using the target signaling packet to perform flow control, to suppress a queue backlog on a congestion side and ensure a low service delay, without affecting a service throughput. In this way, large-scale RoCE networking can be supported, thereby resolving a DCQCN speed control failure problem in a large-scale high-concurrency scenario.

Figure 15:
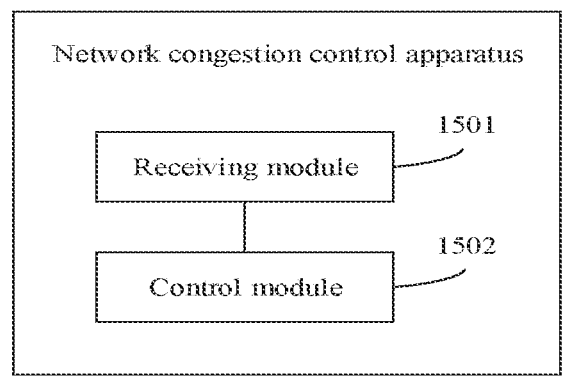
FIG. 15 is a schematic diagram of a structure of a network congestion control apparatus according to an embodiment of this application.

An embodiment of this application provides a network congestion control apparatus. The apparatus is configured to execute a function executed by the network device in the network congestion control method shown in FIG. 11. With reference to FIG. 15, the apparatus includes:

a receiving module 1501, configured to: receive target flow control information sent by a first switch, where the target flow control information is used to indicate flow control, the target flow control information is sent after the first switch receives a target signaling packet that is sent by a second switch in a target network congestion status; and
   a control module 1502, configured to perform flow control based on the target flow control information.

In an example embodiment, the receiving module 1501 is configured to receive first flow control information sent by the first switch. The first flow control information is used to indicate to suspend sending a data packet of a target queue. The target queue is one or more queues of the network device.

The control module 1502 is configured to suspend, based on the first flow control information, sending the data packet of the target queue.

In an example embodiment, the receiving module 1501 is configured to receive a first PFC packet sent by the first switch. A value of a time field of the first PFC packet is a first value. The first value is used to indicate the first flow control information.

The control module 1502 is configured to: determine, based on the value of the time field of the first PFC packet, duration of suspending sending the data packet, and suspend sending the data packet of the target queue within the duration.

In an example embodiment, the receiving module 1501 is configured to receive second flow control information sent by the first switch. The second flow control information is used to indicate to continue sending a data packet of a target queue. The target queue is one or more queues of the network device.

The control module 1502 is configured to continue, based on the second flow control information, sending the data packet of the target queue.

In an example embodiment, the receiving module 1501 is configured to receive a second PFC packet sent by the first switch. A value of a time field of the second PFC packet is a second value. The second value is used to indicate the second flow control information.

The control module 1502 is configured to continue, based on the value of the time field of the second PFC packet, sending the data packet of the target queue.

For the apparatus provided in this embodiment of this application, after the target flow control information sent by the first switch is received, flow control is performed based on the target flow control information, to suppress a queue backlog on a congestion side and ensure a low service delay, without affecting a service throughput. In this way, large-scale RoCE networking can be supported, thereby resolving a DCQCN speed control failure problem in a large-scale high-concurrency scenario.

It should be understood that, when the apparatuses provided in FIG. 13 to FIG. 15 implement the functions of the apparatuses, division of the foregoing function modules is only used as an example for description. In actual application, the foregoing functions may be allocated to different function modules for implementation as required, that is, an inner structure of a device is divided into different function modules, to implement all or some of the functions described above. In addition, the apparatuses provided in the foregoing embodiments have the same concept as the method embodiment. For a specific implementation process of the apparatuses, refer to the method embodiment. Details are not described herein again. In addition, in an example embodiment, when the functions of the apparatuses provided in FIG. 13 to FIG. 15 are implemented, the involved target network congestion status includes but is not limited to an ECN failure state or a CNP failure state. The ECN failure state is a state in which a current queue length of the second switch is greater than a maximum value in a reference range and a CNP is not supplemented. The CNP failure state is a state in which the current queue length of the second switch is greater than the maximum value in the reference range and a CNP is supplemented.

Figure 16:
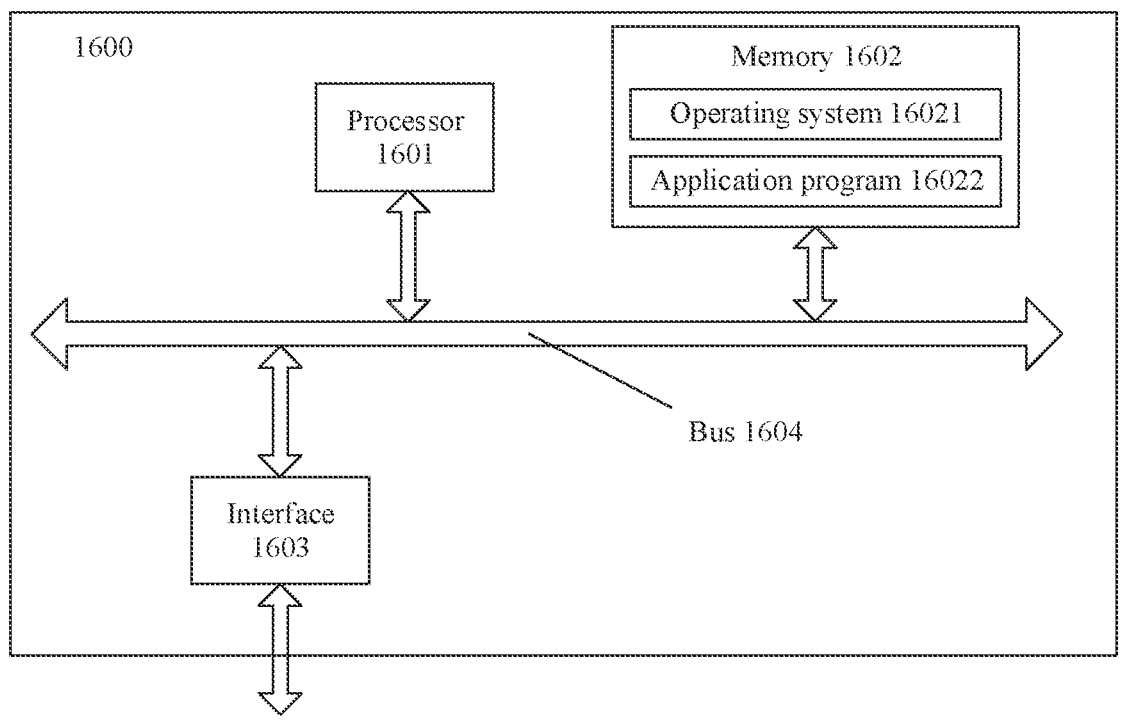
FIG. 16 is a schematic diagram of a structure of a network congestion control device according to an embodiment of this application.

FIG. 16 is a schematic diagram of a hardware structure of a network congestion control device 1600 according to an embodiment of this application. The network congestion control device 1600 shown in FIG. 16 may perform corresponding steps in the network congestion control method provided in the foregoing embodiment shown in FIG. 11.

As shown in FIG. 16, the network congestion control device 1600 includes a processor 1601, a memory 1602, an interface 1603, and a bus 1604. The interface 1603 may be implemented in a wireless or wired manner. For example, the interface 1603 may be a network adapter. The processor 1601, the memory 1602, and the interface 1603 are connected by using the bus 1604.

The interface 1603 may include a transmitter and a receiver to communicate with another communications device. The processor 1601 is configured to perform related processing steps 301 to 304 in the embodiment shown in FIG. 3, and/or the processor 1601 is configured to implement another process of the technology described in this specification.

For example, the network congestion control device 1600 shown in FIG. 16 is the first switch in FIG. 11. The processor 1602 reads instructions in the memory 1601, so that the network congestion control device 1600 shown in FIG. 16 can perform all or some of operations performed by the first switch.

For another example, the network congestion control device 1600 shown in FIG. 16 is the second switch in FIG. 11. The processor 1602 reads instructions in the memory 1601, so that the network congestion control device 1600 shown in FIG. 16 can perform all or some of operations performed by the second switch.

For another example, the network congestion control device 1600 shown in FIG. 16 is the network device in FIG. 11. The processor 1602 reads instructions in the memory 1601, so that the network congestion control device 1600 shown in FIG. 16 can perform all or some of operations performed by the network device.

The memory 1602 includes an operating system 16021 and an application program 16022, and is configured to store a program, code, or instructions. When executing the program, the code, or the instructions, the processor or a hardware device may complete a processing process related to the network congestion control device 1600 in the method embodiment. Optionally, the memory 1602 may include a read-only memory (English: Read-only Memory, ROM for short) and a random access memory (English: Random Access Memory, RAM for short). The ROM includes a basic input/output system (English: Basic Input/Output System, BIOS for short) or an embedded system, and the RAM includes an application program and an operating system. When the network congestion control device 1600 needs to be run, the BIOS or a bootloader in the embedded system that is built into the ROM is used to lead a system to start, and lead the network congestion control device 1600 to enter a normal running state. After entering the normal running state, the network congestion control device 1600 runs the application program and the operating system in the RAM, to complete a processing process related to the network congestion control device 1600 in the method embodiment.

It may be understood that FIG. 16 shows merely a simplified design of the network congestion control device 1600. In actual application, the network congestion control device 1600 may include any quantity of interfaces, processors, or memories.

It should be understood that, the foregoing processor may be a central processing unit (Central Processing Unit, CPU), or may be another general purpose processor, a digital signal processor (digital signal processing, DSP), an application-specific integrated circuit (application specific integrated circuit, ASIC), a field programmable gate array (field-programmable gate array, FPGA), or another programmable logic device, discrete gate or transistor logic device, discrete hardware component, or the like. The general-purpose processor may be a microprocessor, or may be any conventional processor or the like. It should be noted that the processor may be a processor supporting advanced reduced instruction set computing machine (advanced RISC machines, ARM for short) architecture.

Further, in an optional embodiment, the memory may include a read-only memory and a random access memory, and provide instructions and data for the processor. The memory may further include a nonvolatile random access memory. For example, the memory may further store information about a device type.

The memory may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example rather than limitative description, many forms of RAMs are available. For example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

A computer readable storage medium is further provided. The storage medium stores at least one instruction. The at least one instruction is loaded and executed by a processor to implement the network congestion control method in any one of the foregoing embodiments.

This application provides a computer program. When a computer program is executed by a computer, a processor or a computer may be enabled to execute steps and/or procedures corresponding to the foregoing method embodiments.

A chip is provided and includes a processor configured to: invoke instructions from a memory; and run the instructions stored in the memory, so that a communications device on which the chip is installed performs the methods in the aspects.

Another chip is provided and includes an input interface, an output interface, a processor, and a memory. The input interface, the output interface, the processor, and the memory are interconnected through an internal connection path. The processor is configured to execute code in the memory. When the code is executed, the processor is configured to perform the methods in the foregoing aspects.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

Terms such as "first" and "second" in this application are used to distinguish between same items or similar items with basically same functions. It should be understood that "first", "second", and "$n^{th}$" do not have logic or time sequence dependency, and do not limit an implementation sequence. It should be further understood that although terms such as "first" and "second" are used to describe various elements in the description, these elements are not limited by these terms. The terms are merely used to distinguish one element from another element.

In the foregoing specific implementations, the objectives, technical solutions, and beneficial effects of this application are further described in detail. It should be understood that the foregoing description is merely a specific implementation of this application, but is not intended to limit the protection scope of this application. Any modification, equivalent replacement, improvement, or the like made based on the technical solutions of this application shall fall within the protection scope of this application.

What is claimed is:

1. A network congestion control method, wherein the method is applied to a first switch, and the method comprises:
   receiving, by the first switch, a target signaling packet that is sent by a second switch in a case in which a network congestion status is a target network congestion status determined based on a maximum value in a reference range and whether a congestion notification packet (CNP) is not supplemented, wherein the target network congestion status is one of an explicit congestion notification (ECN) failure state or a CNP failure state, the ECN failure state is a state in which a current queue length is greater than the maximum value in the reference range and the congestion notification packet (CNP) is not supplemented, and the CNP failure state is a state in which the current queue length is greater than the maximum value in the reference range and the CNP is supplemented, and the target signaling packet carries flow source information; and
   sending, based on the target signaling packet, target flow control information to a network device corresponding to the flow source information, wherein the target flow control information is used to indicate flow control.

2. The method according to claim 1, wherein the sending, based on the target signaling packet, target flow control information to a network device corresponding to the flow source information comprises:
   sending, based on the target signaling packet, first flow control information to the network device corresponding to the flow source information, wherein the first flow control information is used to indicate the network device to suspend sending a data packet of a target queue, and the target queue is one or more queues of the network device.

3. The method according to claim 2, wherein the sending, based on the target signaling packet, first flow control information to the network device corresponding to the flow source information comprises:
   constructing a first priority-based flow control (PFC) packet based on the target signaling packet, wherein a value of a time field of the first PFC packet is a first value, and the first value is used to indicate the first flow control information; and
   sending the first PFC packet to the network device corresponding to the flow source information.

4. The method according to claim 2, wherein the receiving a target signaling packet that is sent by a second switch in a target network congestion status comprises:
   receiving a first signaling packet that is sent by the second switch in the target network congestion status, wherein the first signaling packet is used to indicate to send the first flow control information.

5. The method according to claim 4, wherein the receiving a first signaling packet that is sent by the second switch in the target network congestion status comprises:
   receiving a first CNP that is sent by the second switch in the target network congestion status, wherein a value of a specific field in a frame header of the first CNP is a first feature value, and the first feature value is used to indicate to send the first flow control information.

6. The method according to claim 1, wherein the sending, based on the target signaling packet, target flow control information to a network device corresponding to the flow source information comprises:
   sending, based on the target signaling packet, second flow control information to the network device corresponding to the flow source information, wherein the second flow control information is used to indicate the network device to continue sending a data packet of a target queue, and the target queue is one or more queues of the network device.

7. The method according to claim 6, wherein the sending, based on the target signaling packet, second flow control information to the network device corresponding to the flow source information comprises:
   constructing a second priority-based flow control (PFC) packet based on the target signaling packet, wherein a value of a time field of the second PFC packet is a second value, and the second value is used to indicate the second flow control information; and
   sending the second PFC packet to the network device corresponding to the flow source information.

8. The method according to claim 6, wherein the receiving a target signaling packet that is sent by a second switch in a target network congestion status comprises:
   receiving a second signaling packet that is sent by the second switch in the target network congestion status, wherein the second signaling packet is used to indicate to send the second flow control information.

9. A network congestion control method, wherein the method is applied to a second switch, and the method comprises:
   recognizing, by the second switch, a target network congestion status based on a maximum value in a reference range and whether a congestion notification packet (CNP) is supplemented or not, wherein recognizing the target network congestion status comprises:

recognizing the target network congestion status as an explicit congestion notification (ECN) failure state in response to a case in which a current queue length is greater than the maximum value in the reference range and the CNP is not supplemented, or recognizing the target network congestion status as a CNP failure state in response to a case in which the current queue length is greater than the maximum value in the reference range and the CNP is supplemented; and sending a target signaling packet to a first switch in response to the target network congestion status, wherein the target signaling packet carries flow source information, and the target signaling packet is used to indicate the first switch to perform flow control.

10. The method according to claim 9, wherein the target signaling packet comprises a first signaling packet or a second signaling packet, and the sending a target signaling packet to a first switch in response to the target network congestion status comprises:

sending the first signaling packet to the first switch in response to the target network congestion status and the current queue length is greater than a first threshold, wherein the first signaling packet is used to indicate the first switch to send first flow control information, the first flow control information is used to indicate a network device corresponding to the flow source information to suspend sending a data packet of a target queue, and the target queue is one or more queues of the network device.

11. The method according to claim 10, wherein before the sending the first signaling packet to the first switch, the method further comprises: obtaining a first CNP; setting a value of a specified field in a frame header of the first CNP to a first feature value; and using the first CNP as the first signaling packet; or before the sending the second signaling packet to the first switch, the method further comprises: obtaining a second CNP; setting a value of a specified field in a frame header of the second CNP to a second feature value; and using the second CNP as the second signaling packet.

12. The method according to claim 9, wherein recognizing the target network congestion status comprises:

reading the current queue length and an ECN threshold range, wherein the ECN threshold range is used to indicate a probability of adding an ECN identifier, the reference range is determined based on the ECN threshold range, and the ECN identifier is used to indicate that congestion occurs in a network; and recognizing the network congestion status based on the current queue length and the ECN threshold range.

13. A network congestion control apparatus, wherein the apparatus comprises:

a receiver, configured to receive a target signaling packet that is sent by a second switch in a case in which a network congestion status is a target network congestion status determined based on a maximum value in a reference range and whether a congestion notification packet (CNP) is not supplemented, wherein the target network congestion status is one of a explicit congestion notification packet (ECN) failure state or a CNP failure state, the ECN failure state is a state in which a current queue length is greater than the maximum value in the reference range and the congestion notification packet (CNP) is not supplemented, and the CNP failure state is a state in which the current queue length is greater than the maximum value in the reference range and the CNP is supplemented, and the target signaling packet carries flow source information; and a transmitter, configured to send, based on the target signaling packet, target flow control information to a network device corresponding to the flow source information, wherein the target flow control information is used to indicate flow control.

14. The apparatus according to claim 13, wherein the transmitter is configured to send, based on the target signaling packet, first flow control information to the network device corresponding to the flow source information, wherein the first flow control information is used to indicate the network device to suspend sending a data packet of a target queue, and the target queue is one or more queues of the network device.

15. The apparatus according to claim 14, wherein the transmitter is configured to:

construct a first priority-based flow control (PFC) packet based on the target signaling packet, wherein a value of a time field of the first PFC packet is a first value, and the first value is used to indicate the first flow control information; and send the first PFC packet to the network device corresponding to the flow source information.

16. The apparatus according to claim 14, wherein the receiver is configured to receive a first signaling packet that is sent by the second switch in the target network congestion status, wherein the first signaling packet is used to indicate to send the first flow control information.

17. The apparatus according to claim 16, wherein the receiver is configured to receive a first CNP that is sent by the second switch in the target network congestion status, wherein a value of a specific field in a frame header of the first CNP is a first feature value, and the first feature value is used to indicate to send the first flow control information.

18. The apparatus according to claim 13, wherein the transmitter is configured to send, based on the target signaling packet, second flow control information to the network device corresponding to the flow source information, wherein the second flow control information is used to indicate the network device to continue sending a data packet of a target queue, and the target queue is one or more queues of the network device.

19. The apparatus according to claim 18, wherein the transmitter is configured to:

construct a second priority-based flow control (PFC) packet based on the target signaling packet, wherein a value of a time field of the second PFC packet is a second value, and the second value is used to indicate the second flow control information; and send the second PFC packet to the network device corresponding to the flow source information.

* * * * *